Aug. 15, 1950 — W. S. PEARSON — 2,518,813
AUTOMATIC MACHINE TOOL
Filed June 24, 1944 — 16 Sheets-Sheet 9
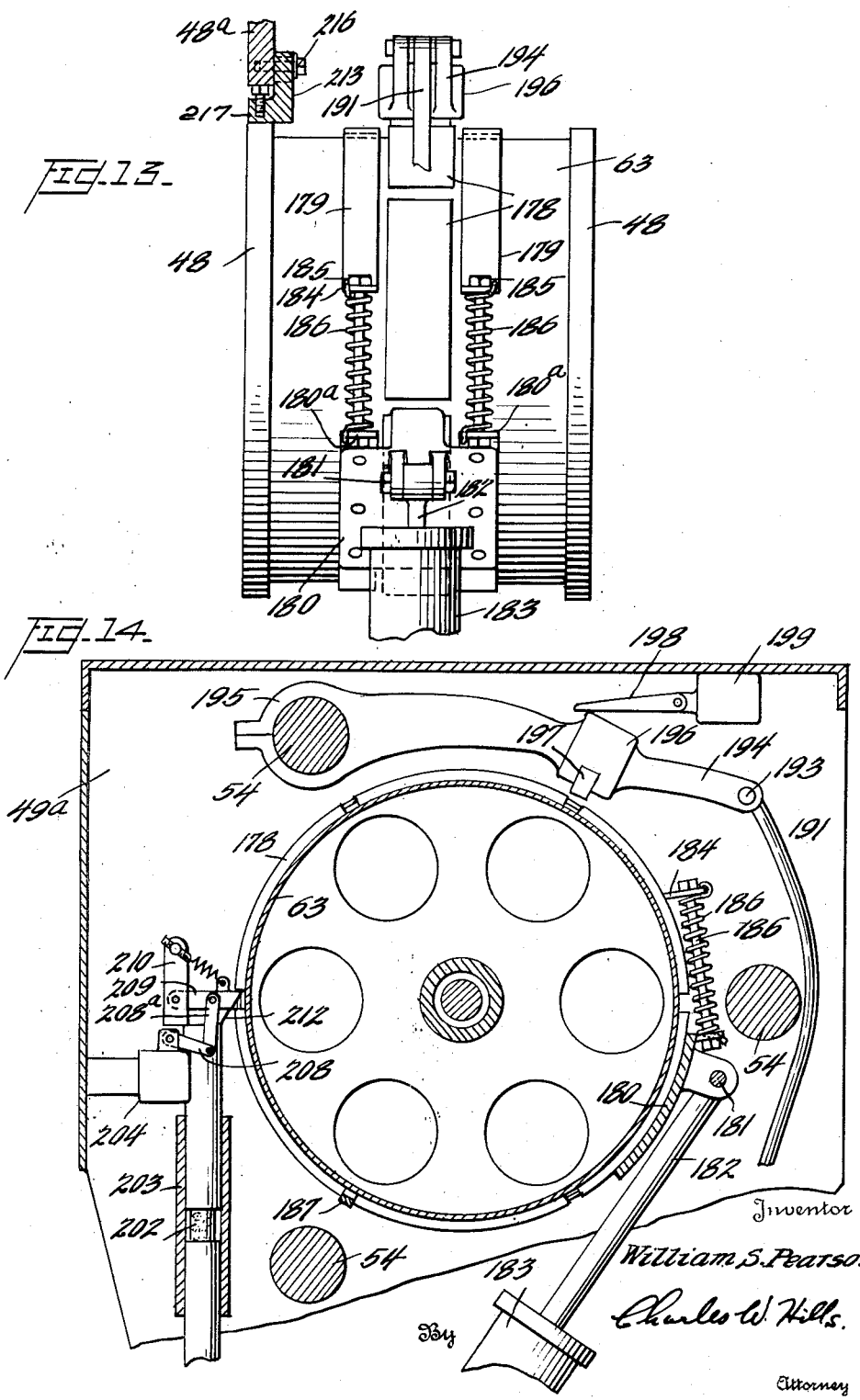

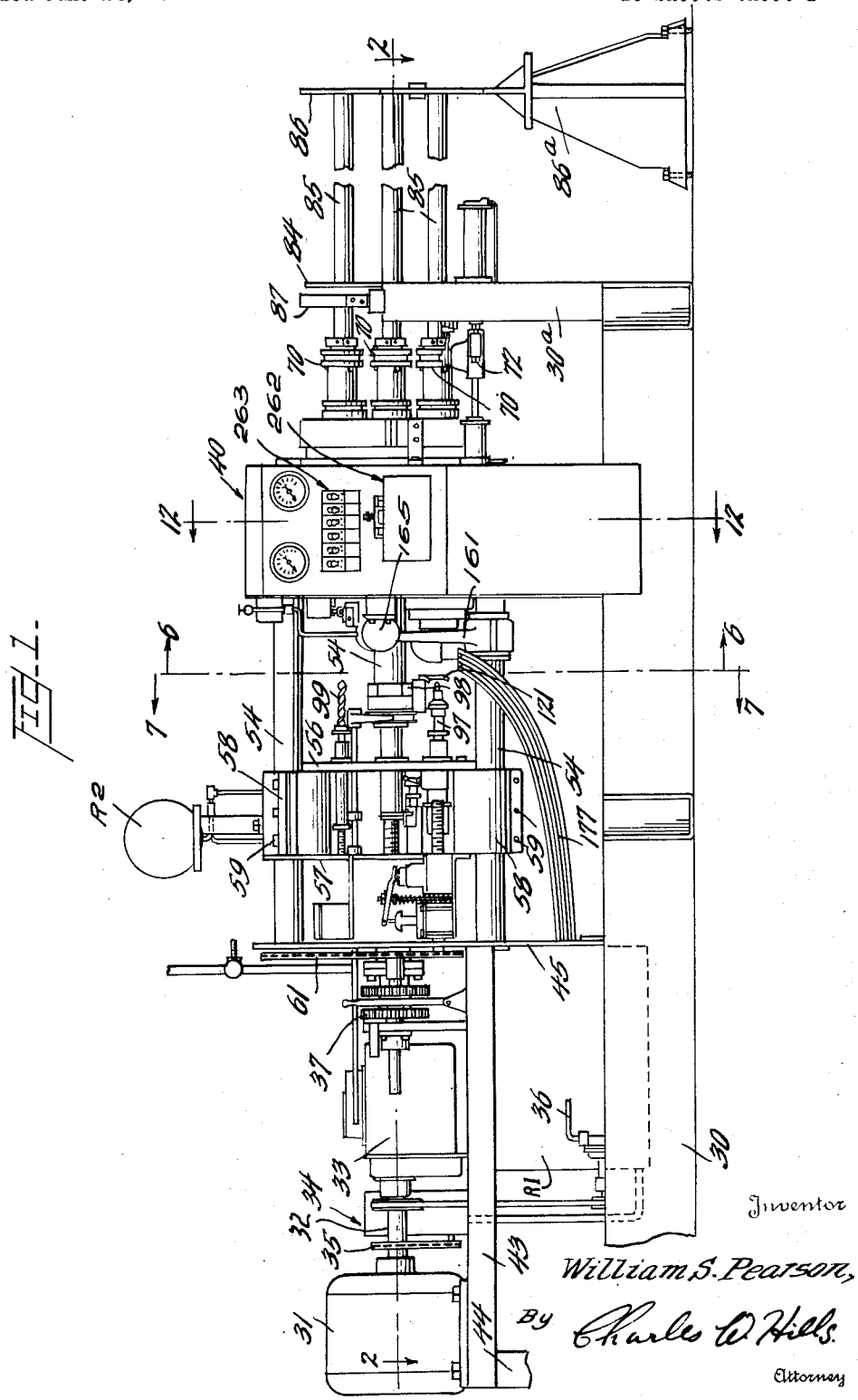

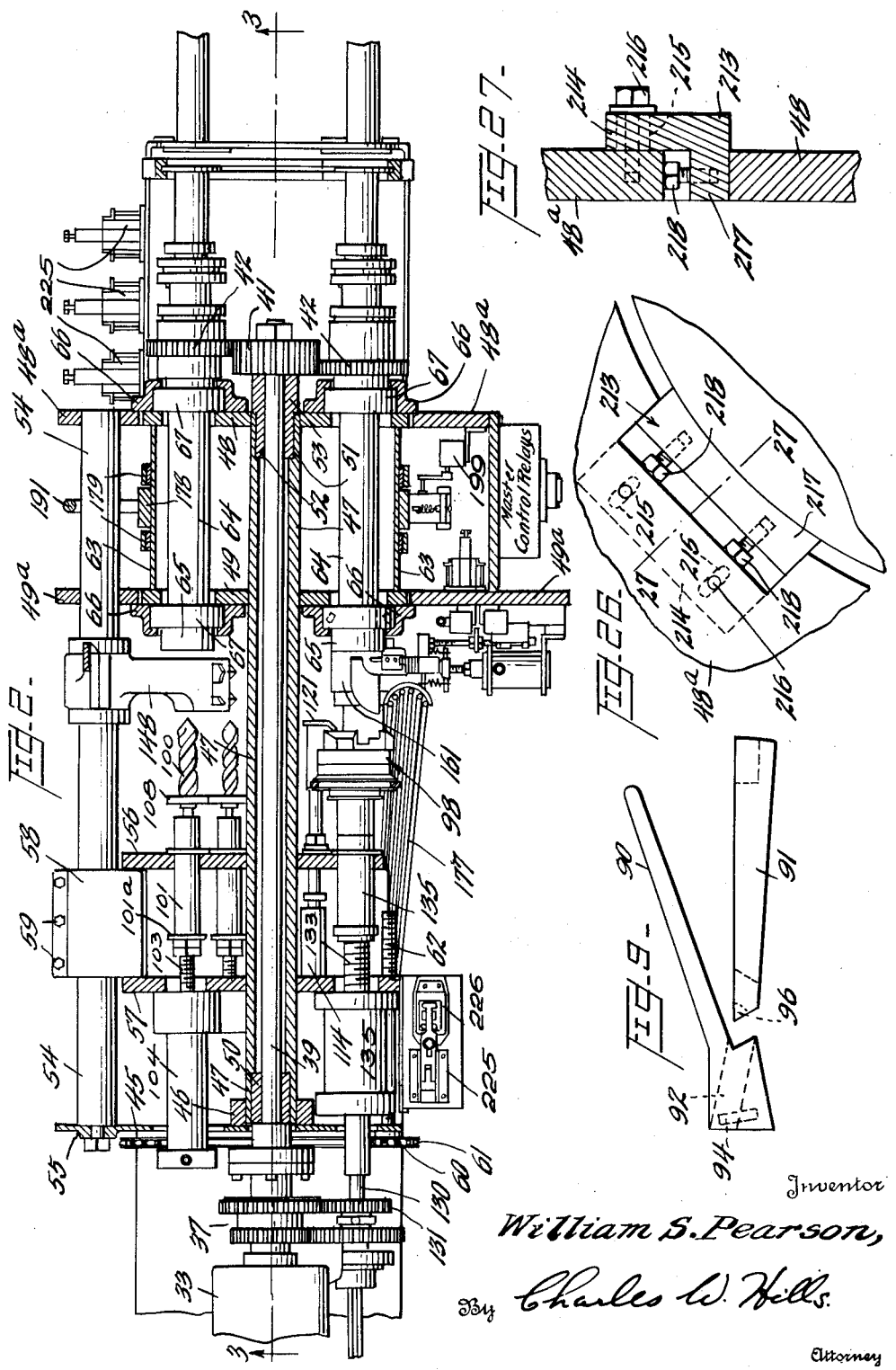

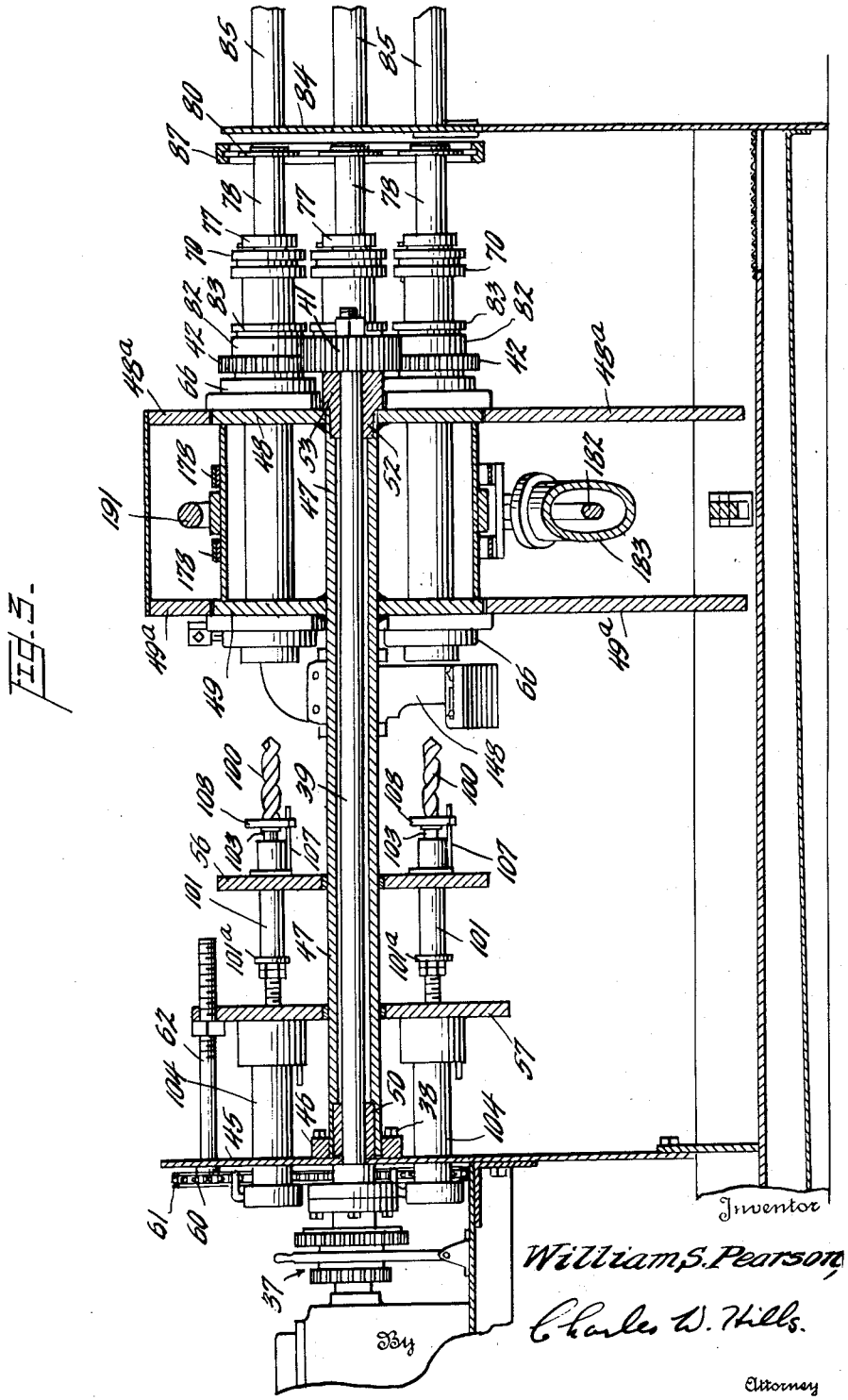

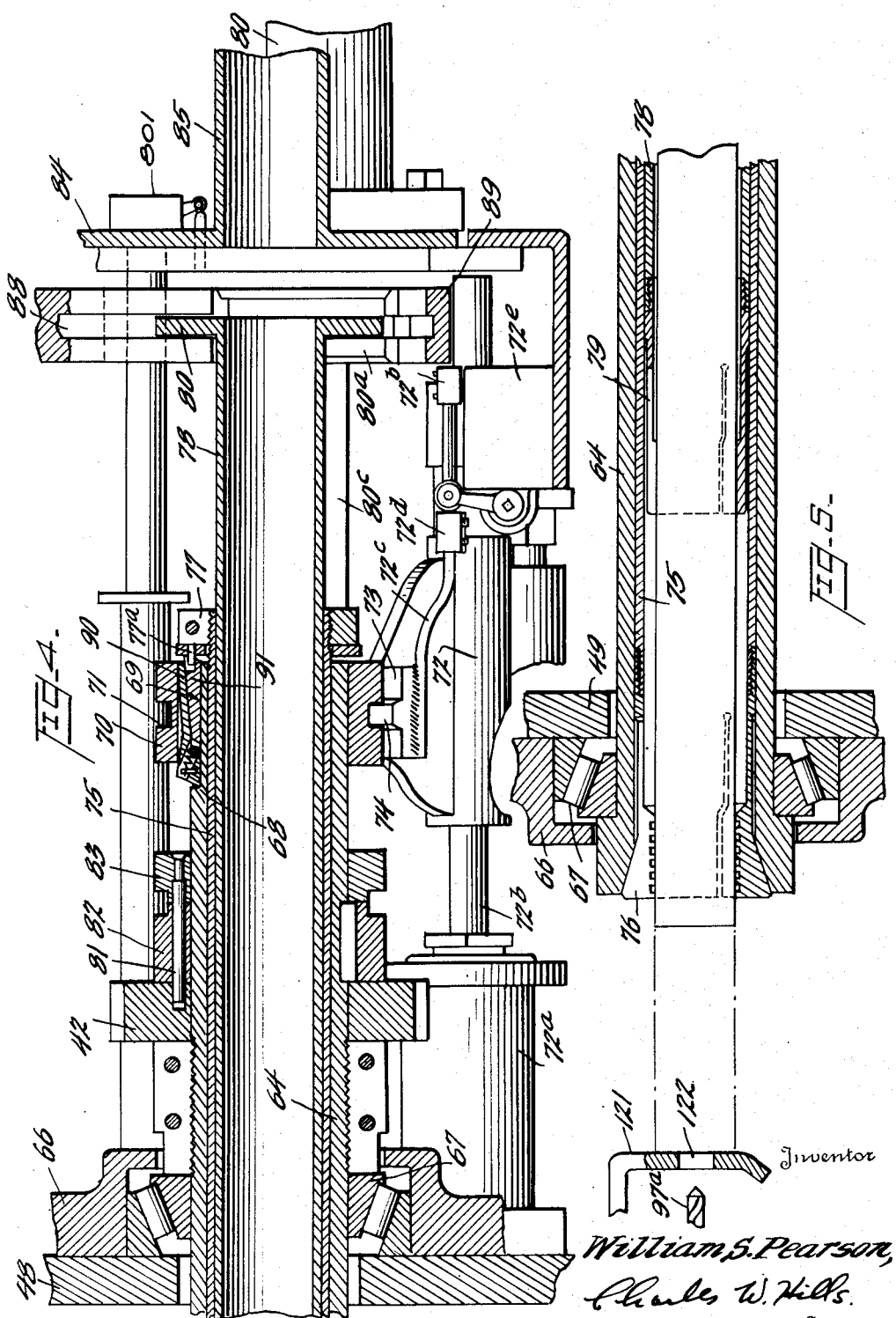

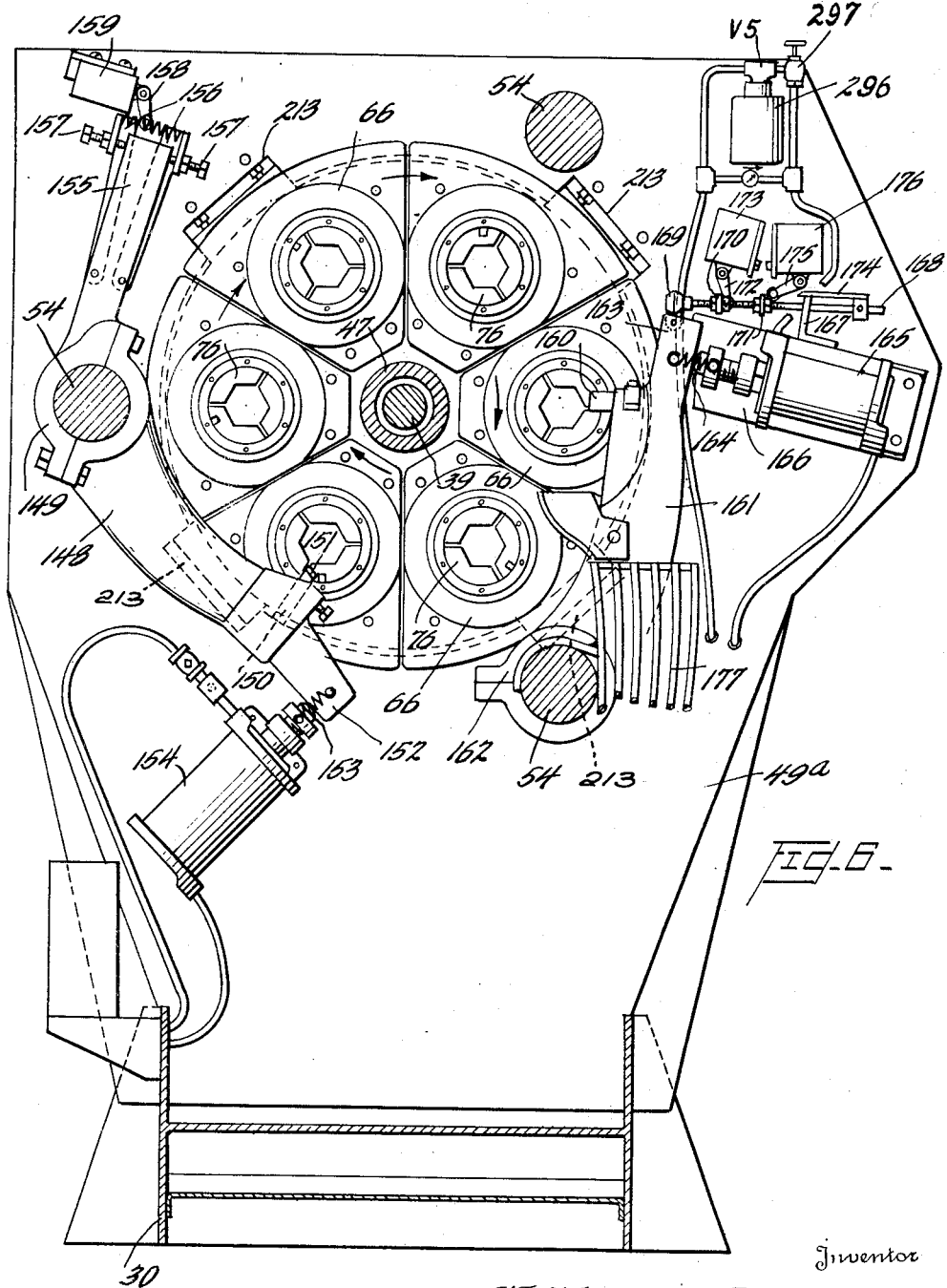

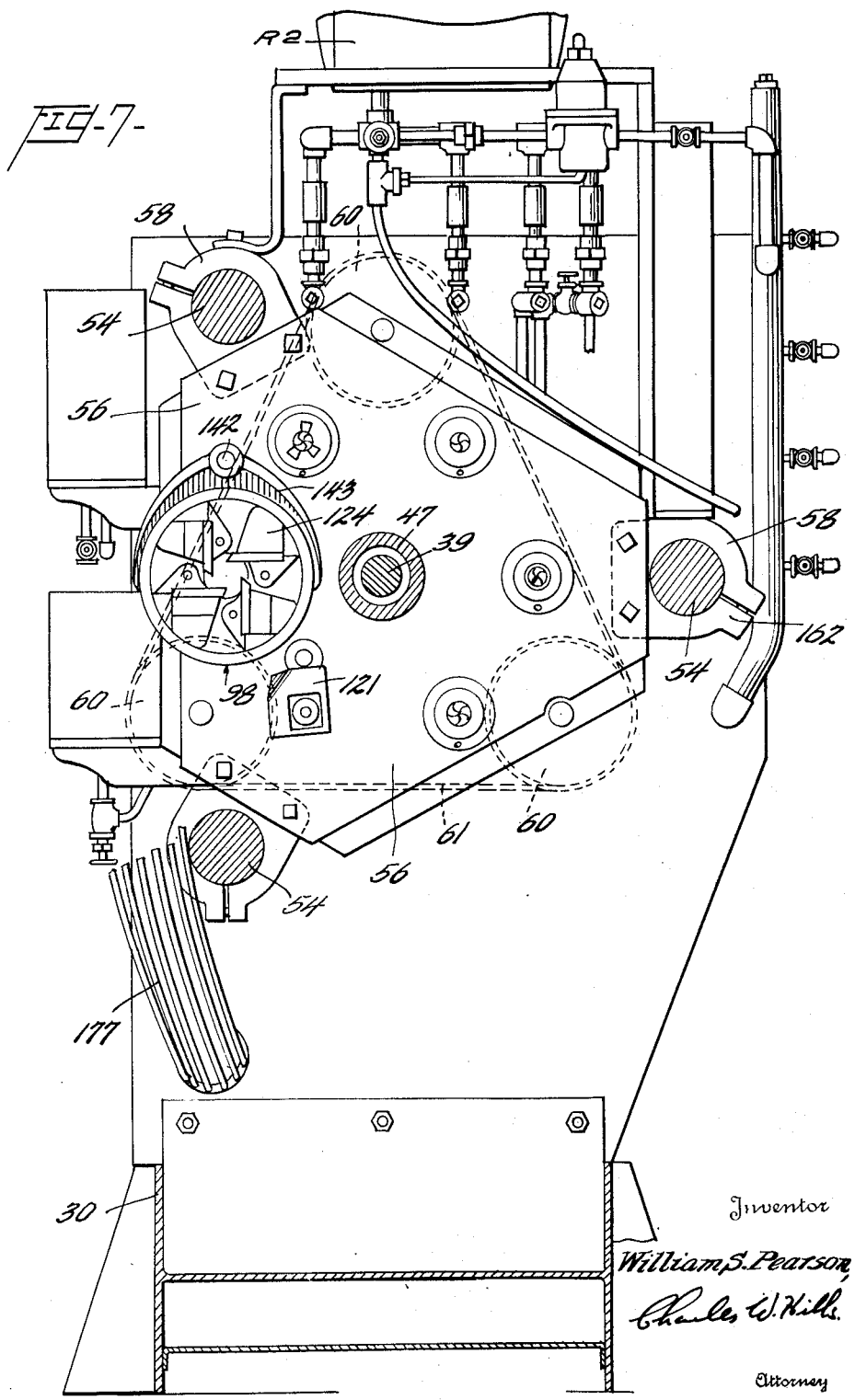

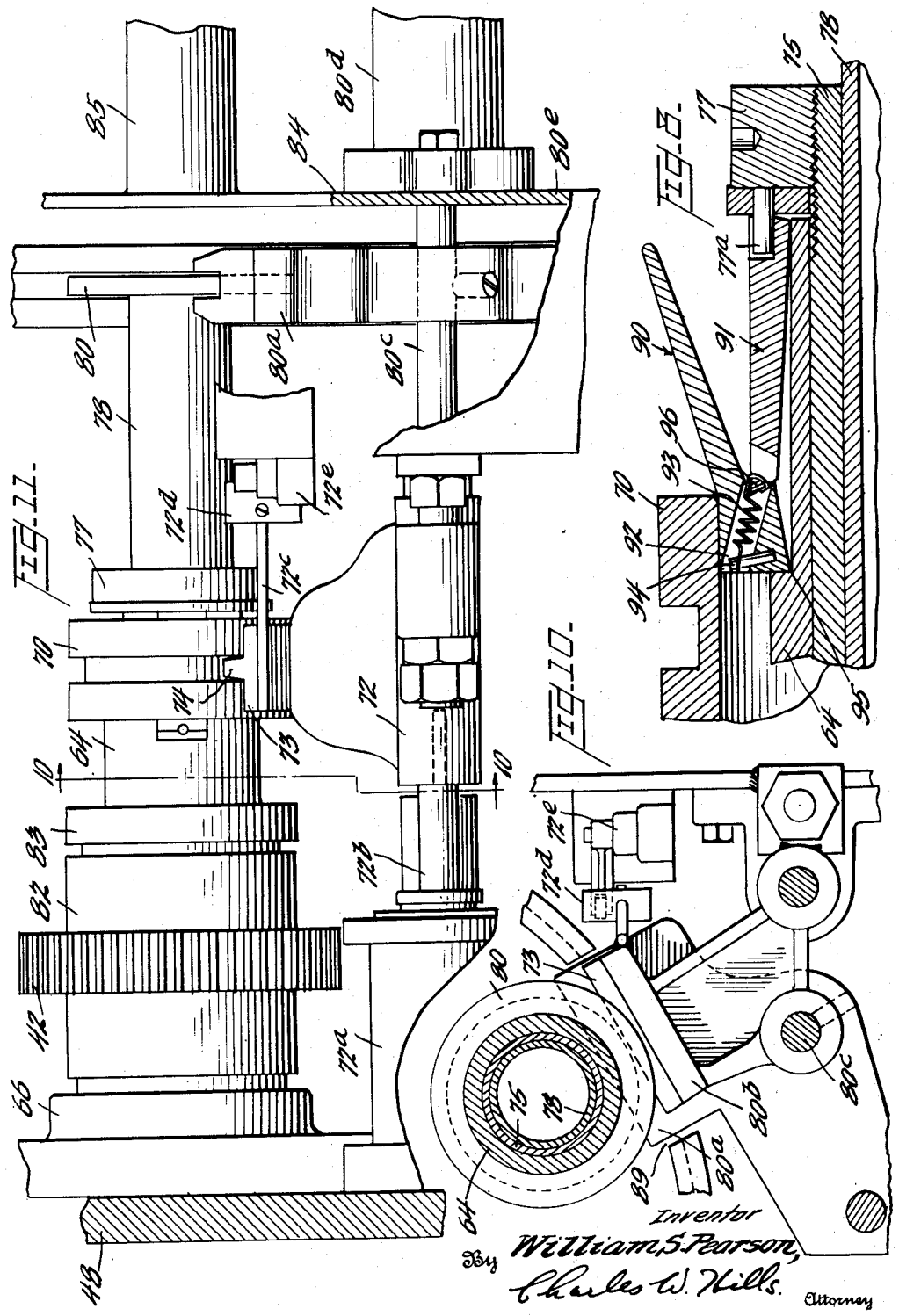

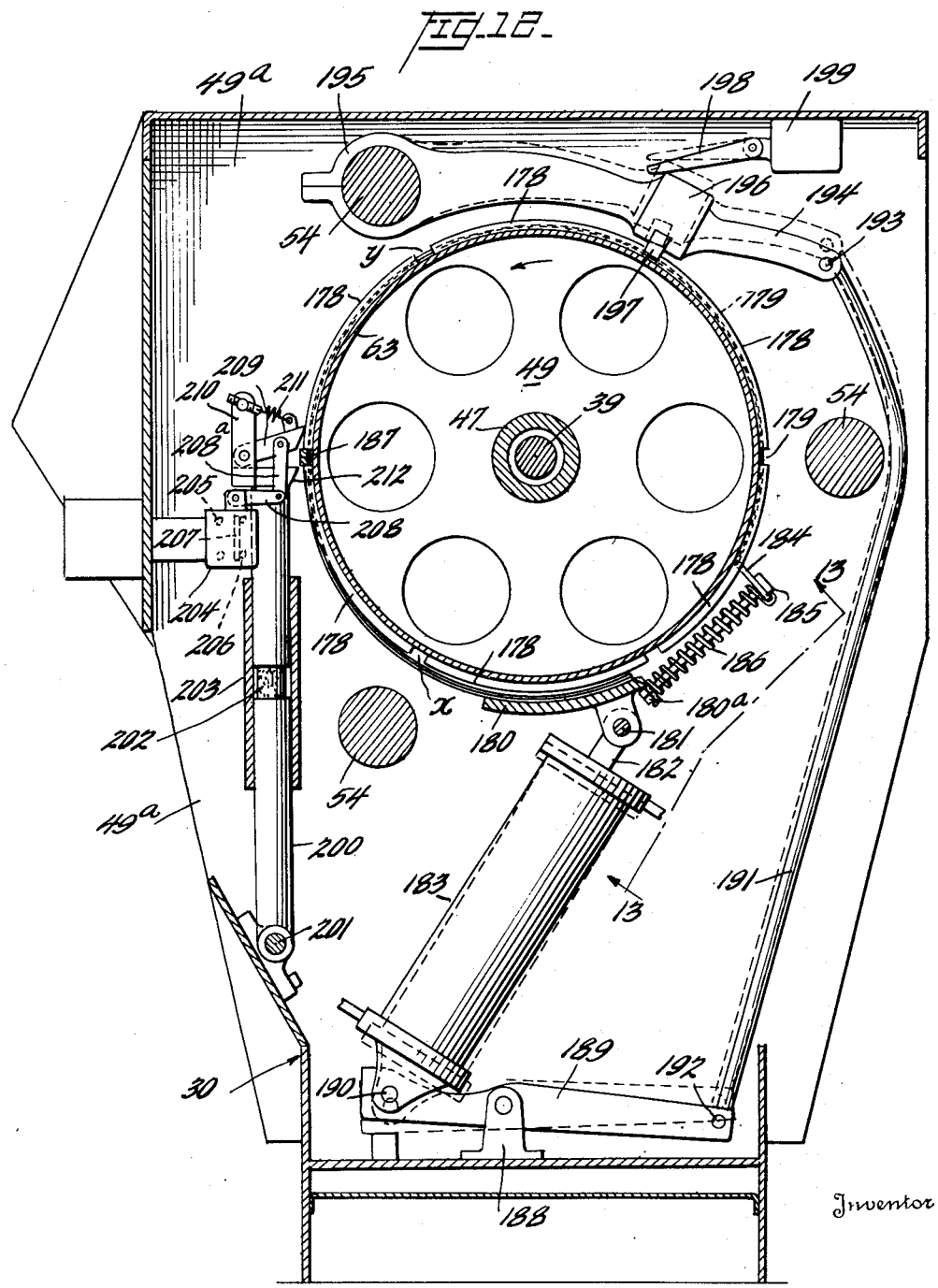

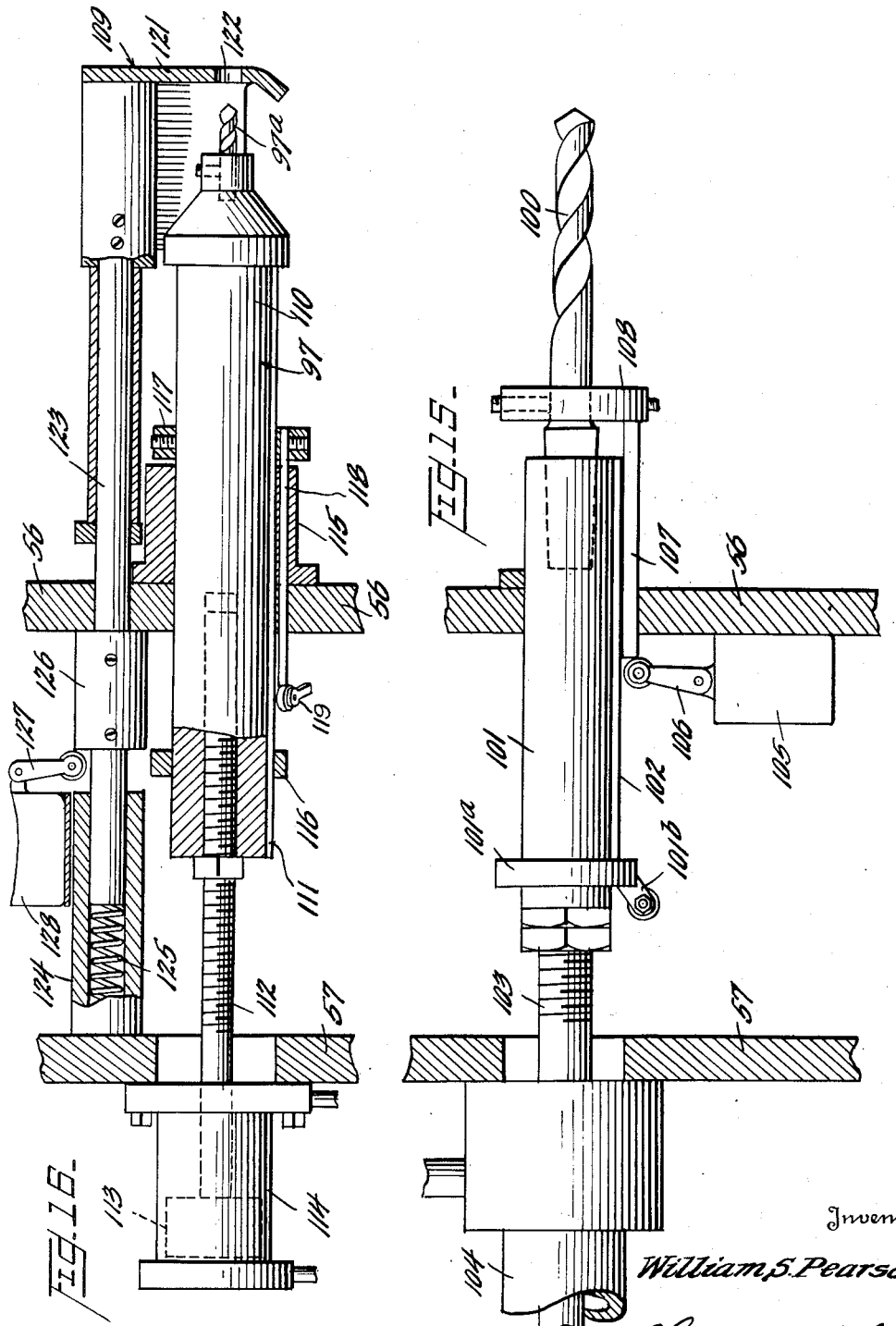

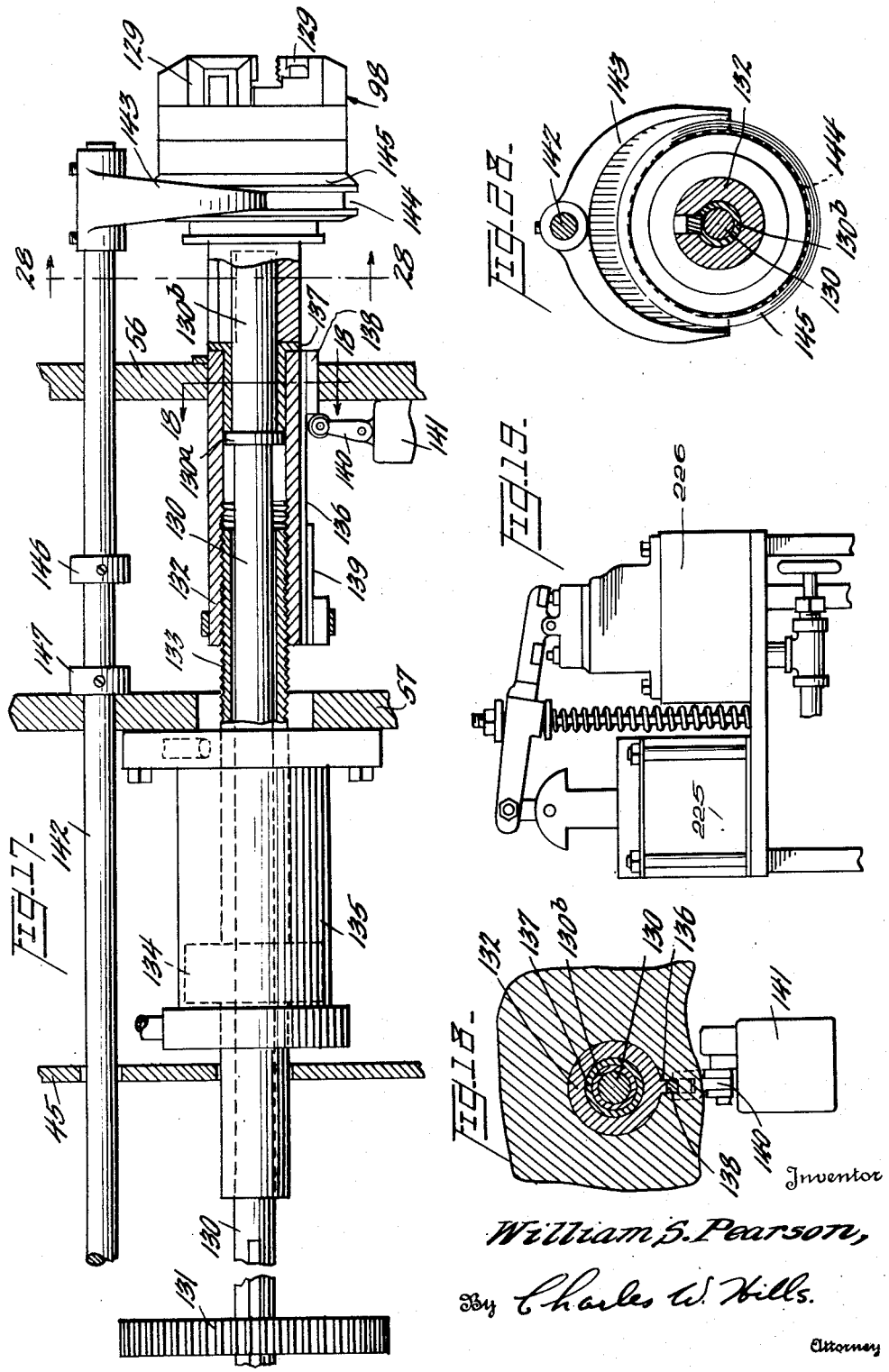

Aug. 15, 1950  W. S. PEARSON  2,518,813
AUTOMATIC MACHINE TOOL
Filed June 24, 1944  16 Sheets-Sheet 12
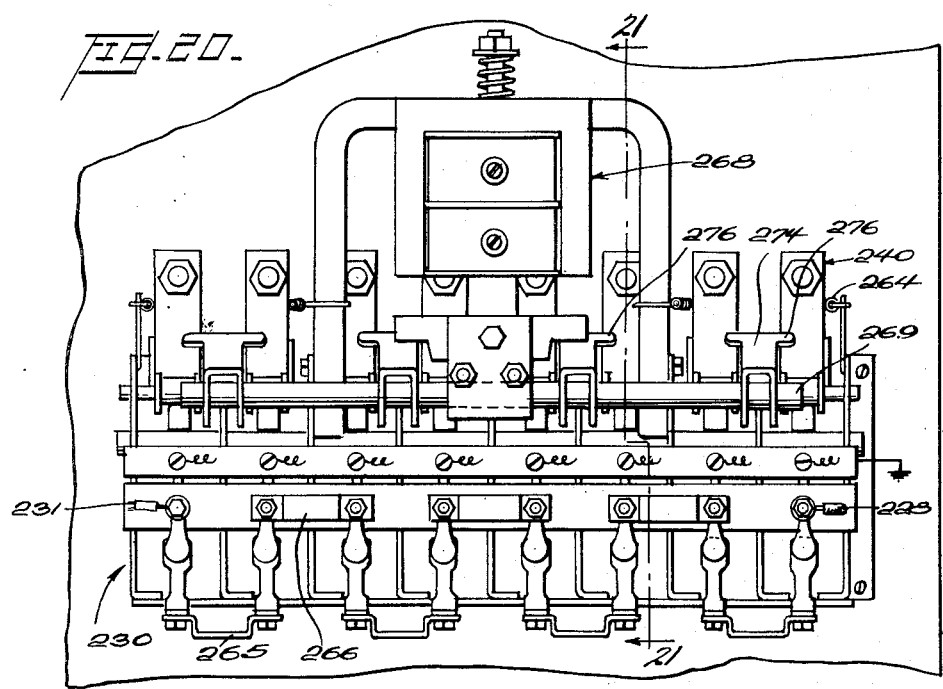
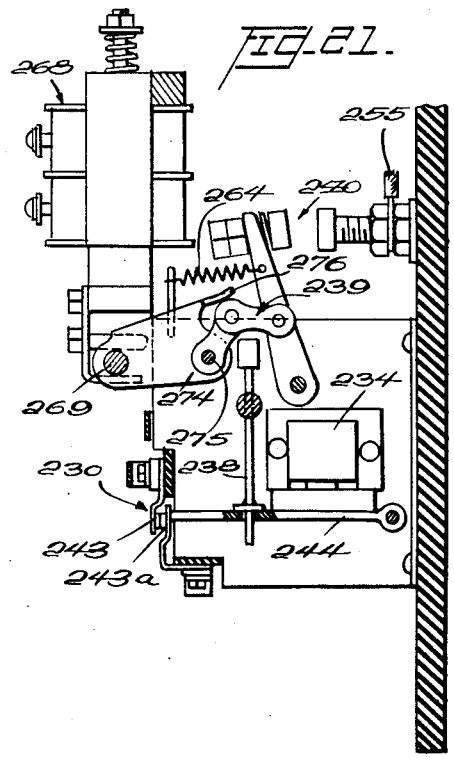
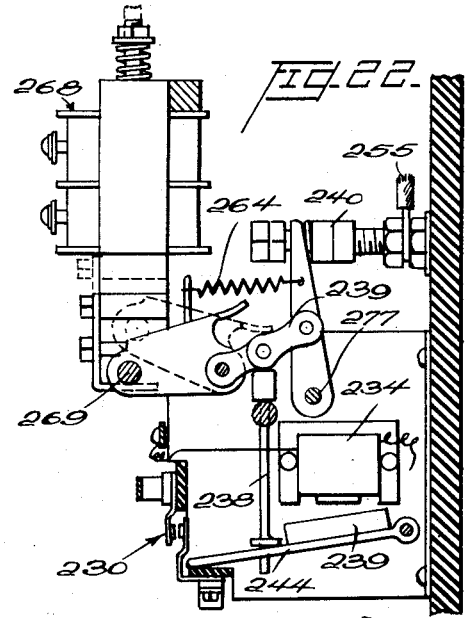
Inventor
William S. Pearson,
By Charles W. Hills.
Attorney

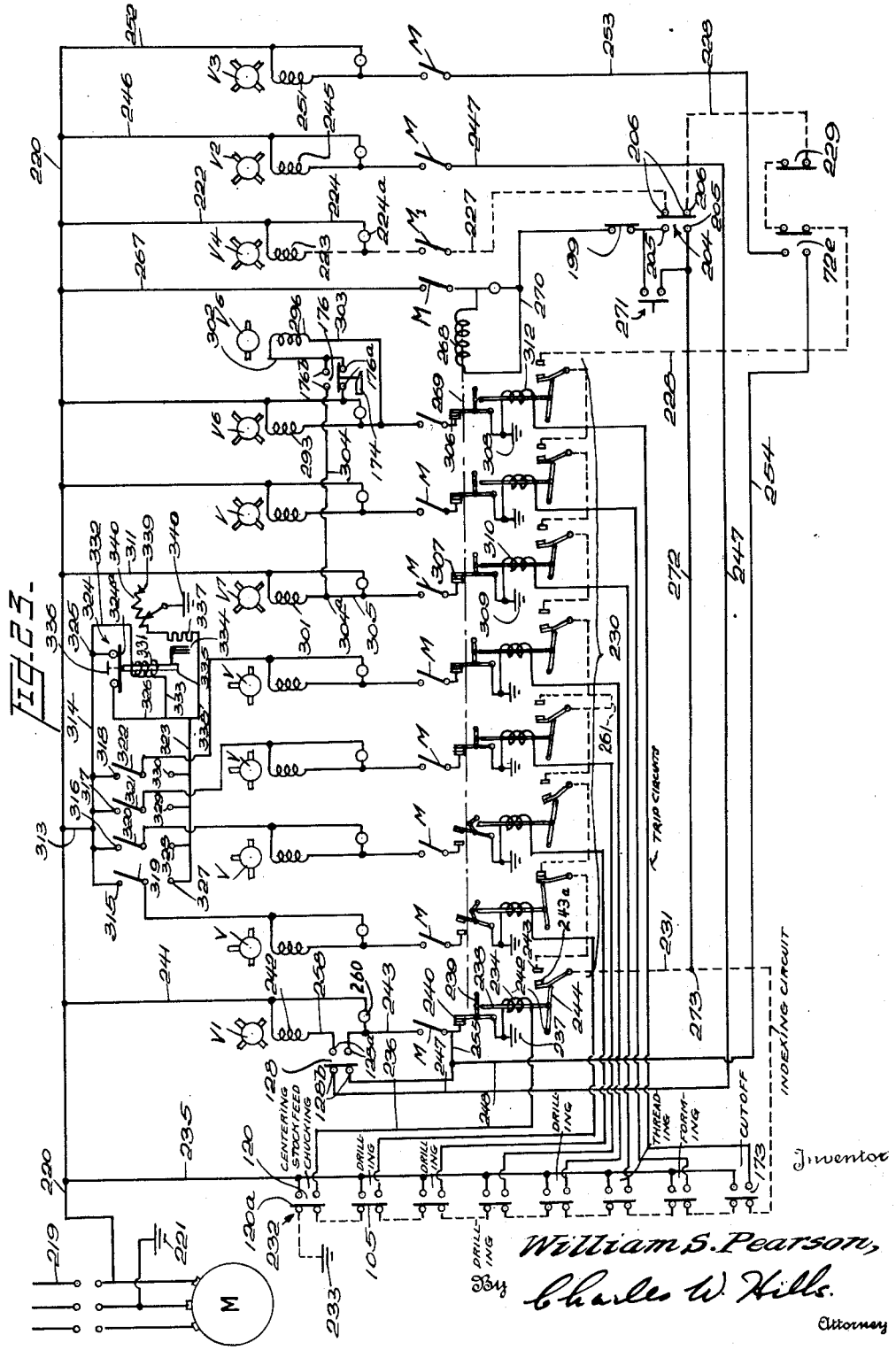

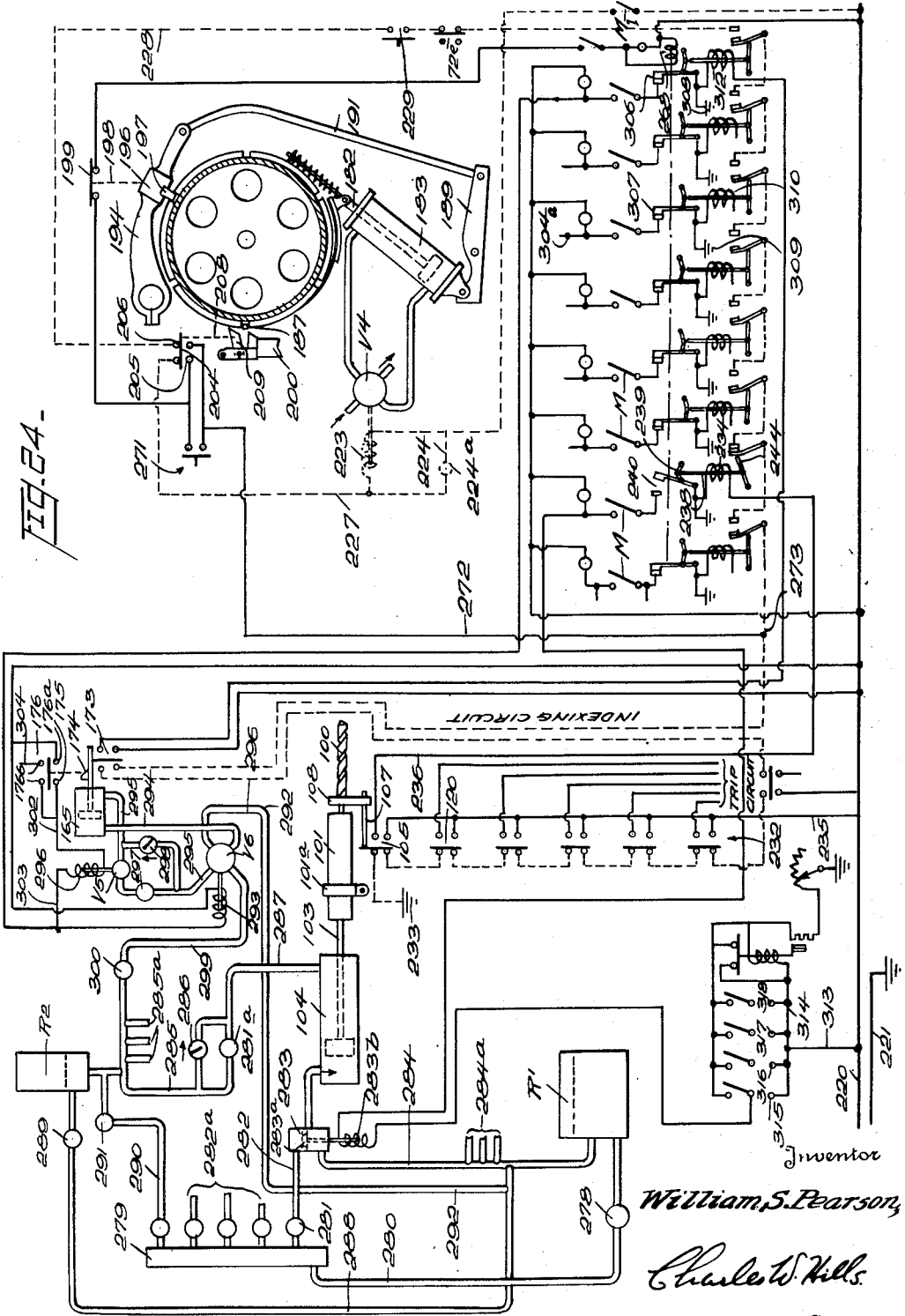

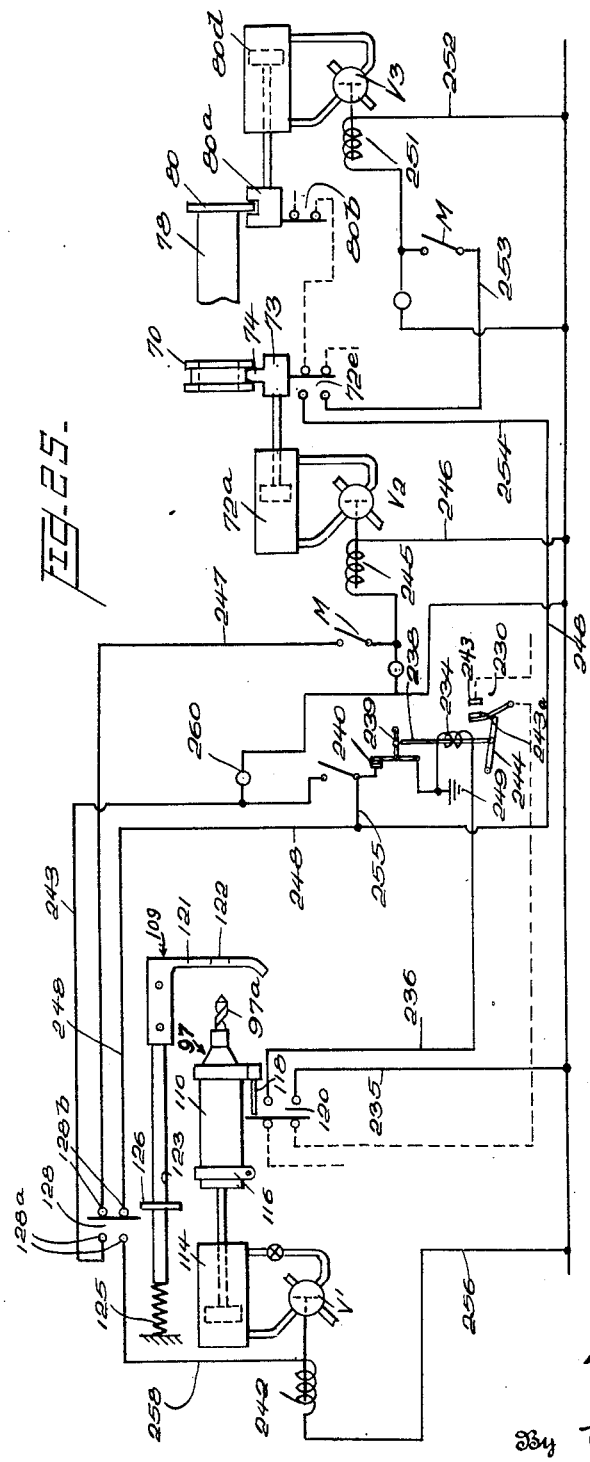

Aug. 15, 1950     W. S. PEARSON     2,518,813
AUTOMATIC MACHINE TOOL
Filed June 24, 1944     16 Sheets-Sheet 16
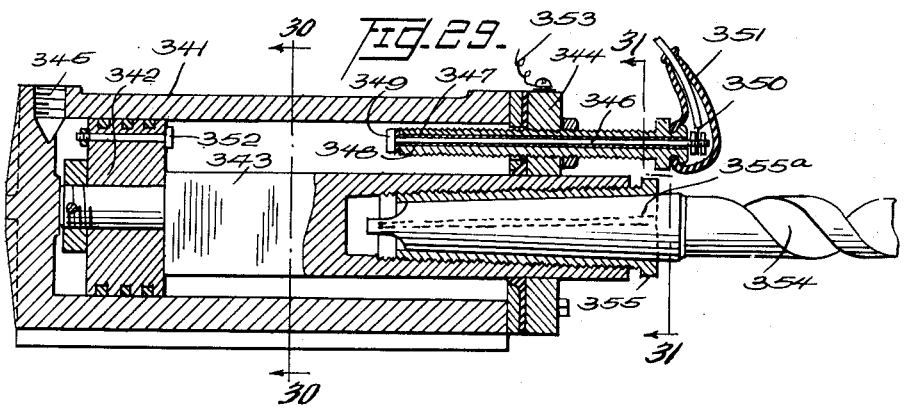
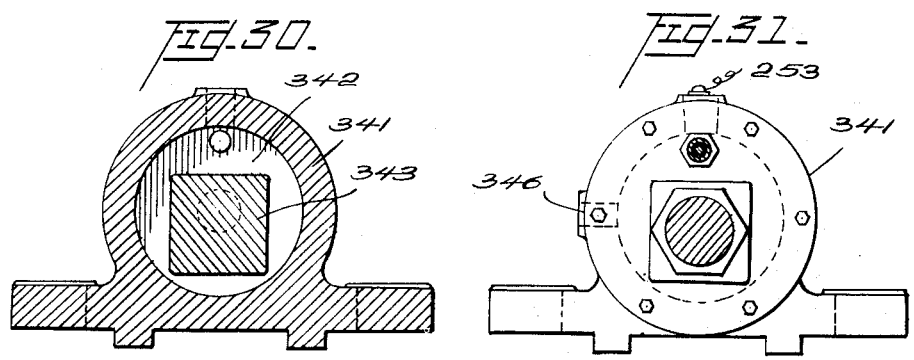
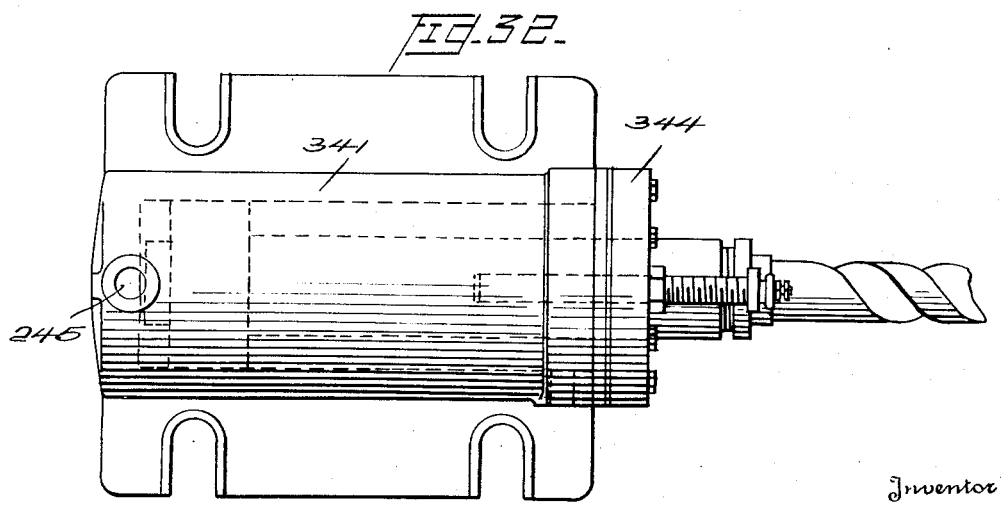
Inventor
William S. Pearson,
By Charles W. Hills.
Attorney Patented Aug. 15, 1950

2,518,813

UNITED STATES PATENT OFFICE 2,518,813

AUTOMATIC MACHINE TOOL

William S. Pearson, Baltimore, Md., assignor to Peerco, Inc., Park Ridge, Ill., a corporation of Illinois Application June 24, 1944, Serial No. 541,962

10 Claims. (Cl. 29—37)

This invention is directed to an improved automatic stock working machine, during the operation of which a single piece of stock is subjected to a plurality of machine operations, such as forming, drilling, tapping and final cutoff.

It will be understood that while for the purposes of description certain specific operations are disclosed and discussed herein, these operations may be changed as to sequence or they may be replaced by other and different machine operations such as rolling, swaging or the like, as the requirements of the finished product dictate.

It is an important object of the present invention to provide in a compound machine of the above character, a separate and independently operable tool advancing and retracting mechanism for each tool, each such mechanism, since it is independent of all other, being admirably subject to independent control and sequence whereby a plurality of operations, each requiring a different period of time for completion, may be started simultaneously, each tool being returned immediately upon completion of the operation thereof even though other, companion tools are still processing stock and whereby the speed of operation of any individual tool or other operating instrumentality may be varied without required break down of the machine.

In providing a machine tool of the above character, I contemplate the use of a gang of tools which are non-rotatively mounted with respect to the position thereof, and a stock holding mechanism in which the stock is rotated and which itself is rotatable upon an indexing operation to advance each piece of stock to the next succeeding tool. In the use of such a device, it will be seen that considerable damage will result to the stock and the tools if the indexing takes place while any one of the tools is still operating upon its respective piece of stock.

To the end that this possibility of damage may be eliminated entirely, and to the end that the indexing operation may not take place until all tools have completed their respective operations, there is provided herein an improved and novel electric circuit which carries the indexing current. This circuit is virtually an interlock circuit, including in series, a plurality of contacts, each of which is associated with one of the tools or instrumentalities that contribute to the forming of the stock and is closed only upon completion of the operation of the respective tool or instrumentality. Thus there is provided herein an indexing circuit which is broken until each and all of the respective interlock contacts are closed by completion of the respective operation, whereupon the indexing circuit itself is complete and the indexing may take place to advance the stock for the next similar cycle of operation.

It is another object of the invention to provide in the indexing circuit a further group of make and break switches, in series, these switches being closed by engagement with a respective tool or instrumentality mounting as the latter returns to starting position. Thus indexing can not take place until all tools are retracted and out of the way of the stock being worked upon.

It is a further object of the present invention to provide for a compound machine tool of the above character, an improved arangement for locking the stock and feeding it forward after a cutting off operation has occurred, this cutoff operation taking place only upon completion of other stock working operations in that position.

It is another object of the present invention to provide a machine of the above character in which all positive feed drive cams are eliminated.

Still another important object of the present invention is to provide, in association with an electric circuit of the above character, an improved pneumatic or hydraulic tool advance and return mechanism, together with an improved stock feed mechanism, this advance and return mechanism being constructed and actuated in such a manner that the pressure for returning a given tool which has finished its work ahead of other tools is not drawn from the line pressure which is advancing the other tools as they perform other operations, but rather is drawn from an independent pressure source whereby line pressure for advancing the tools still at work does not drop and hence the effectiveness of these tools is not lost.

With the elimination of positive cam advance and return and with the use of pneumatic-hydraulic advance and return it will be seen that much of the difficulty heretofore experienced in jamming and breakage of tools and work because of continued feed when a tool breaks or otherwise jams has been eliminated. In my present machine the hydraulic-pneumatic feed is indirect as compared to cams and the feed action thereof stops when undue pressures between the tool and the work occurs.

It is another object of the present invention to provide in a compound machine tool an improved system whereby the advance and return of each of a plurality of independent tools may be accomplished independently in sequence with the completion of the previous movement by that tool, this arrangement including for each tool, a switch mechanism having an arm which is actuated by a moving part of the tool as it operates, the respective switch affecting a solenoid which in turn controls the flow of pneumatic or hydraulic pressure to operate the tool in the desired manner after a previous, predetermined position of the tool has been attained.

Still another object of the invention is to provide in an automatic machine tool, independent operating means for a plurality of tools whereby the relative speed of feed of the tool to the work may be varied in each tool merely by regulation of a pressure circuit without requiring a change or reforming of cams or the like.

It is a further object of the invention to provide an improved machine tool whereby, when a tool, advanced to a stock piece and working on the same becomes overheated, it is temporarily retracted to permit cooling and the introduction of coolant into the cut whereupon it is again automatically advanced and continues its cutting operation.

It is still another object of the present invention to provide an improved chucking arrangement for holding the stock as it is being operated upon.

It is a still further object of the invention to provide in a machine tool having a plurality of individual tools, means whereby one or more selected tools may be rendered inoperative in the event that a particular article being produced does not require the operation performed by such tool or tools.

Another object of the invention is to provide an improved tool mounting whereby the tool is advanced to the work through a pivotal movement on a plane disposed normally to the axis of rotation of the stock, said path defining a relatively large arc.

It is a further object of the present invention to provide in conjunction with an improved stock feed and stock gripping mechanism, an improved arrangement whereby the stock gripping collet and the stock feeding mechanism are controlled by fluid pressure, the pressure controls being in turn actuated and controlled by an electrical system energized in accordance with the attained position of the fed stock.

Another object of the present invention is to provide an improved stock feeding and gripping mechanism in which the pressure control therefor is in turn controlled by electrical means, the electrical means being energized by a trip member actuated by the free end of the advancing stock, thus to render the feeding and gripping mechanism operative in the presence of fed stock and inoperative in the absence thereof, whereby, when the stock reserve has run out a continuation of the operation of the machine will be prevented, there being a switch in the main indexing circuit which is not effected in the absence of an advancing stock piece.

It is a further object of the present invention to provide in an automatic multiple machine tool, a final threading and cutoff arrangement having a pressure operated actuating circuit which is controlled by an electrical circuit, the circuits being so arranged that the cutoff operation is partially completed and dwelled until completion of the threading operation is insured, whereupon the cutoff operation is completed to remove the finished work piece from the reserve stock.

It is a more specific object of the present invention to provide in a multi-tool automatic machine, an indexing drum through which stock to be worked upon is advanced, this drum being actuated by pressure means which is in turn controlled by an electrical circuit operable only upon completion of the previous operation by all of the tools, the indexing drum also having associated therewith a master switch which, upon completion of the indexing, is closed to energize a circuit with which it is associated, the latter circuit in turn energizing a solenoid that operates a master reset member to close the individual circuits of all of the tools so that the subsequent operations may be initiated and performed.

It is another object of the present invention to provide in an automatic machine tool, an improved circuit arrangement which includes an individual control circuit for each tool and an indexing circuit, a plurality of contacts and an operating relay on each tool circuit, the contacts being so arranged that upon completion of the operation of the tool said contacts in the tool control circuit are opened to cut the tool out of operation while another pair of contacts in the indexing circuit are closed to complete that circuit, thereby partially conditioning the circuit so that the latter may initiate a subsequent cycle of operation by a subsequent indexing operation when all tool operations are completed and returned.

It is a further object of the invention to provide a tool arrangement of the above character which can be mounted as an attachment in a suitable machine.

The invention includes the above and other features and combinations of the structure set forth in the following specification and attached drawings in which:

Figure 1 is a side elevation of a machine embodying my invention;

Figure 2 is a fragmentary, cross-sectional view taken on the line II—II of Figure 1;

Figure 3 is a fragmentary, enlarged cross-sectional view taken on the line III—III of Figure 2, parts being shown in elevation;

Figure 4 is an enlarged fragmentary, cross-sectional view showing the details of the stock feed and collet operating mechanism;

Figure 5 is a fragmentary, cross-sectional view of the left-hand extremity of the mechanism shown in Figure 4 and including the stock collet gripping mechanism;

Figure 6 is a cross-sectional view taken on the line VI—VI of Figure 1;

Figure 7 is a cross-sectional view taken on the line VII—VII of Figure 1;

Figure 8 is an enlarged fragmentary, cross-sectional view showing the collet operating mechanism;

Figure 9 is an elevational view of the collet operating mechanism;

Figure 10 is a cross-sectional view taken on the line X—X of Fig. 11;

Figure 11 is a fragmentary plan view looking down upon the stock advancing mechanism;

Figure 12 is a cross-sectional view taken on the line XII—XII of Figure 1;

Figure 13 is a cross-sectional view taken on the line XIII—XIII of Figure 12;

Figure 14 is a fragmentary view similar to Figure 12 showing the parts in different operative position;

Figure 15 is a side elevational view, partly in cross-section of a preferred drill mounting construction;

Figure 16 is a side elevational view, partly in cross-section of the centering tool and stock feed control trip;

Figure 17 is a side elevational view, partly in cross-section of the threading tool;

Figure 18 is a cross-sectional view taken along the line XVIII—XVIII of Figure 16;

Figure 19 is a side elevational view of the preferred type of solenoid-valve construction used herein;

Figure 20 is a fragmentary front elevational view of the master control relay panel;

Figure 21 is a cross-sectional view taken on the line XXI—XXI of Figure 20;

Figure 22 is a view similar to Figure 19 showing the parts in a different operative position;

Figure 23 is a schematic diagram showing the electrical circuits embodying my invention;

Figure 24 is a schematic diagram showing the cooperation of the electrical circuit embodying my invention with the indexing mechanism, a typical drill mechanism and the cutoff mechanism, this view also showing an exemplary hydraulic circuit for operating the tools;

Figure 25 is a schematic diagram showing the cooperative relationship between the operation of the centering tool, the stock feed advancing mechanism and the stock gripping mechanism, together with the cooperating electrical circuits;

Figure 26 is a fragmentary schematic view of the structure for rotatably mounting the indexing drum;

Figure 27 is a cross-section taken on the line XXVII—XXVII of Fig. 26;

Figure 28 is a cross-section taken on the line XXVIII—XXVIII of Fig. 17;

Figure 29 is a longitudinal vertical cross section of a modified form of my invention;

Figure 30 is a cross section taken on the line XXX—XXX of Figure 29;

Figure 31 is a cross section taken on the line XXXI—XXXI of Figure 29; and

Figure 32 is a top plan view of the construction of Figure 29.

Before proceeding with a detailed description of the mechanisms and circuits embodying my invention, as shown in the drawings, a brief statement of the ultimate aims and the function of the machine will be presented.

The present invention contemplates an automatic machine tool in which may be embodied a tool carriage having a plurality of tools reciprocably mounted therein, the carriage itself also being reciprocably mounted to accommodate variation in size of the articles being produced as manifested by variations in the amount of stock being worked upon which extends from the stock retaining mechanism. The tools, while reciprocable, may be non-rotatably mounted. There is also provided a stock feeding and indexing mechanism which includes the usual reserve stock retaining channels and an indexing drum having stock receiving channels aligned with the said retaining channels. A mechanism is provided for feeding the stock progressively through the indexing drum, the outwardly extending part of the stock being that which is formed by the various tools. The indexing drum is divided into a plurality of stations, each including one of the stock receiving channels, which is aligned with one or more of the tools so that as a tool reciprocates toward the stock at the particular station it performs its operation thereon.

After each of the tools has so performed its operation it is retracted and the indexing drum is advanced by one station so that each protruding piece of stock therein is now aligned with the next succeeding tool to the end that the next operation may be performed thereon. Thereafter the succeeding cycle including the next advance of the tools is completed, whereupon indexing again occurs. Thus it will be seen that the cycle of operation includes alternate indexing and tool advance so that a fresh piece of stock is progressively formed in predetermined steps as it advances from the first station to the last station at which a cutoff operation is performed. The rotation of the stock within the indexing drum is accomplished by means of an electric motor having a drive shaft which extends longitudinally of the machine through the tool carriage and the indexing drum to a point on the remote side of the drum where a gear at the end of the drive meshes in the usual manner with gears on each of the stock spindles. Thus the electric motor simultaneously drives or rotates each piece of stock at the respective stations on the indexing drum.

One of the difficulties which has been experienced in the past with machines of the above character is that should a tool such as a drill become dull, its progressive operation on the particular piece of stock cannot be retarded so that a greater time interval is involved and it will be forced into the stock at a rate faster than it is able to work thereon, with the result that the tool is broken.

The present invention contemplates the utilization of a novel pressure system and electrical system for each instrumentality by means of which the operation of the instrumentality may be individually controlled as to feed.

In accordance with the invention there is provided herein, for each of the tools, an independent fluid pressure assembly which includes a pressure line having control valves therein. These valves are arranged in association with relays, there being a relay for each tool. Each of the relays is connected in an independent circuit associated with each of the tools, the circuit being energized or de-energized in accordance with the predetermined position of the respective tool. For instance, each circuit is provided with a switch that deenergizes the respective circuit as the tool reaches its most advanced position indicating the completion of the particular operation. Thus the tool is completely cut out of the circuit upon the completion of its particular operation and is subjected to a fluid pressure retracting force which returns it to its initial position.

The indexing mechanism is also herein actuated by fluid pressure means which is in turn also controlled by an independent indexing circuit. The indexing circuit has incorporated therein two banks of make and break contacts. The contacts in one bank are closed only upon disposal of a respective tool in its extremely advanced position under which circumstances the operation on the stock for that tool is completed. The other bank of contacts are closed only upon attainment by each respective tool of its fully retracted position. Thus it will be seen that during each cycle of operation, the indexing circuit will be incomplete so long as each one of the tools has not reached its most advanced position and thus completed its operation and also moved into its fully retracted position in readiness for the next operation after the indexing movement.

As each of the tools attain their fully retracted position and close the second bank of contacts in the indexing circuit, this circuit will be completed and thus be enabled to control the pressure means by which the indexing operation takes place. If, however, for some reason or other, one or more of the tools does not complete its respective operation or one or more of the tools does not attain a fully retracted position out of the path of the stock upon indexing movement, the indexing circuit will be incomplete at one or more points with the result that indexing cannot occur.

Another difficulty which has been encountered and past is that the machine continues to run if unattended and if the stock reserve is depleted. The present invention, however, contemplates the provision of a stock feed trip which is moved by the advancing piece of stock to operate a switch, whereby a centering operation is initiated, the centering tool, in turn, conditioning another circuit during the performance of its operation whereby continued operation of the machine takes place. Thus it will be seen that in the absence of stock the feed trip will not be operated and thus centering operation will not take place. Unless these circumstances continued operation of the entire machine is prevented.

It is also contemplated by the present invention to provide a plurality of independent circuits for the tools and the various operating instrumentalities in each of which there is provided a visible indicia such as a light or the like, this light being energized or de-energized along with the respective circuits in accordance with the performance of the various operations. Thus if these lights are assembled on a panel and the respective positions thereof are correlated with the tools with which they are associated, the operator, by merely viewing the panel may tell whether or not the machine is running properly and if it is not, which circuit and thus which tool is causing the difficulty. As shown herein the panel is mounted upon the machine and is, of course, visible from a distance. If desired, however, the indicia such as the bulbs may be assembled in a box or on a panel suitably constructed as a piece of office furniture whereby it may be connected with, yet disposed remotely from the machine in the office of a production manager or anyone else who is concerned with the continued, efficient operation of the machine.

As indicated previously, the invention, as embodied in an individual tool setup contemplates the provision of a reciprocable mounting for the tool or for the instrumentality which is to perform an operation, a two-way operating fluid pressure mechanism for advancing and retracting the tool or instrumentality in proper sequence in accordance with the control of a valve in the fluid pressure circuit, electrical means including a relay for operating the valve in accordance with a predetermined position of the reciprocable tool or instrumentality mounting, this electrical means including for each tool or instrumentality an independent circuit having switch means therein. The switch means is so disposed that the actuating portion thereof is in the path of the tool mounting to be operated by the mounting in one direction or the other in accordance with movement thereof. The switch means in each circuit is arranged to energize or de-energize the circuit, thereby to operate a valve in the fluid pressure line of the respective tool or instrumentality, whereby the desired ultimate operation of the mounting takes place. Furthermore this switch, in each case, is so associated with the circuit that upon completion of a particular operation of the respective tool or instrumentality the respective individual circuit is broken.

It will be understood that the tools and instrumentalities, as will be seen presently, are distributed throughout the machine at convenient positions and that, therefore, preferably, the respective fluid pressure actuating means and the respective switches are mechanically associated with the particular mounting.

The invention also contemplates a plurality of tools and an indexing drum through which stock is fed to the tools, the indexing drum having for instance six stations from each of which, during operation of the machine, there extends a work piece in a partial state of completion, this state reaching completion as a particular stock piece at a particular station has progressed successively around all of the tool positions to be acted on successively by each of the tools, until a final cutoff operation is completed. Associated with the indexing drum is a master indexing circuit by means of which pressure means for indexing the drum is operated, there also being provided for each of the tools an individual circuit by means of which pressure means for operating the individual tools or advancing them to the stock is accomplished, the indexing circuit being so arranged that there is provided therein, in series, two banks of make and break switches, one bank being sequentially closed upon completion of the respective operation, that is movement of each respective tool to the farthest advanced point toward the work, and the other bank of switches being closed upon return of the respective tools to starting position, whereby the indexing circuit is completed only upon the return of all of the tools to the initial position so that indexing may take place. The indexing drum also is provided with means for operating a switch in a reset circuit, whereby that circuit is energized to reset each of the individual tool circuits and close the same to enable the cycles of operation to again begin, each of the circuits having a contact arrangement which is closed by this resetting operation, each contact being sequentially opened upon completion of the work of each tool at the time the respective make and break switch in the index circuit is closed to successively complete the indexing circuit.

In the above, a collet operating member for gripping the stock or a stock advancing member may be considered as tools since herein, as will appear presently, these elements are actuated in a manner somewhat similar to the tools and likewise throw switches to control their operation as in the case of the tools which actually work upon the stock to shape the same.

GENERAL CONSTRUCTION OF THE MACHINE

The general organization of a machine tool embodying the features of my invention is best shown in Figures 1, 2 and 3.

Broadly speaking the machine shown is composed of a drive portion, a tool and tool mounting supporting portions, an indexing portion and a reserve stock supporting portion, these portions all being aligned in spaced relationship and longitudinally of a supporting bed 30 which is preferably trough shaped to serve as a coolant reservoir, to receive the finished articles as they are cut from the stock and to receive shavings.

In describing the present embodiment of my invention the mechanical aspects thereof will first be considered and explained together with the mechanical functions thereof, whereupon reference will be made to the wiring diagrams which show the circuits by means of which the various mechanical elements are controlled and operated in sequence.

The drive mechanism shown at the left-hand side of Figure 1 may be of any suitable construction, but as shown herein includes an electric motor 31 having a drive 32 connected to a suitable transmission 33, there being connected with the drive shaft 32 a suitable pumping mechanism 34 which has a drive 35. The outlet of the pumping system for the coolant is shown at 36 and of course connects with a plurality of coolant conduits, each of which leads to one of the stock positions to be described later. It will be understood that suitable outlet conduits are provided for the hydraulic pumping system which lend to the respective instrumentalities to be described later.

Associated with the transmission 33 is a suitable drive arrangement 37 by means of which a threading attachment may be rotated. A drive shaft 39, as will be seen from Figure 2, extends longitudinally of the machine through the various portions described above and terminates at the remote side of the indexing mechanism shown generally at 40. The remote end of the drive shaft 39 is provided with a gear 41 which meshes in the usual manner with a plurality of planet gears 42 to be described presently.

The drive mechanism described above may be mounted upon the machine in any suitable manner as upon a platform 43, one end of which is secured to the upper end of a standard 44 and the other end of which is secured to an upstanding supporting plate 45. An annulus 46 is secured as by bolts 38 to the central part of the inner surface of the supporting plate 45, the latter having an aperture aligned with the aperture in the annulus. The annulus 46 is arranged to receive therein the end of a tube member 47 which extends longitudinally through the machine and the various parts thereof to be described presently and into fixed engagement in any suitable manner with an end plate 48 of the indexing drum of the indexing mechanism 40, the companion end plate of this drum being shown at 49 and being suitably apertured to receive an intermediate part of the tube 47.

As will be seen from Figure 2 the drive shaft 39 extends through the tube 47 and is rotatably mounted therein by means of bushings 50 and 51, the bushing 51 being at the drive end of the shaft and including an inner portion 52 within the tube 47 and an outer, enlarged portion 53 disposed on the outer side of the supporting plate 48. As will be seen from Figure 2, this enlarged portion 53 serves admirably as a spacer between the drive gear 41 and the plate 48. With the foregoing it will be seen that there is provided herein an efficient, rotatable mounting for the drive shaft 39, whereby the gear 41 may be rotated by operation of the motor 31 and the associated transmission and drive mechanism 33.

As best shown in Figures 1 and 2, a plurality, three in the present instance, of longitudinally disposed supporting members 54 are mounted on the machine, one end of these members being supported in the plate 45 as at 55 and the other end extending through apertures in the indexing drum supporting plates 48a and 49a of the indexing mechanism 40. These supporting bars 54 are essentially for the purpose of supporting a tool carriage, however, as will be seen presently, certain of the tools are also secured to the machine by means of arms which are pivoted about the supporting bars 54.

The tool supporting carriage includes spaced supporting plates 56 and 57 which in turn are secured to clamp members 58, the latter being formed from cooperating parts which when held together by bolts 59, define channels which securely and tightly, yet slidably receive the respective supporting bar 54.

As will be explained more fully presently, a number of the tools utilized with the present machine are mounted upon the plates 56 and 57 to reciprocate relative thereto, whereby they may be advanced toward the stock to be worked on and retracted therefrom when the operation is completed.

The bodily movement of the tool carriage and the sliding action of the clamps 58 longitudinally along the supporting bars 54 is for the purpose of accommodating the tools to different lengths of stock protruding from the indexing mechanism as dictated by the overall length of the articles being produced. This sliding action is essentially an adjustment of the machine and plays no part in the actual cycle of operation thereof. This adjustment may be accomplished in a variety of ways but in the present construction there is provided three triangularly disposed sprockets 60 which are connected together by a drive chain 61. Each of the sprockets is fixedly secured at the ends of a threaded rod 62, the rod being rotatably mounted in the supporting plates 45 and having the threaded remote end thereof extending through a threaded aperture in the plate 57. Since the chain 61 connects the three sprockets 60 it will be seen that manual rotation of one as by a wrench or the like will cause rotation of all three together with the respective rods 62, whereby the entire tool carriage is advanced or retracted in accordance with the direction of rotation of the rod in view of the threaded engagement of the plate 57 with the threaded portion of each rod. It has been found that this feature greatly augments the versatility of a machine tool in which it is incorporated since it enables the machine, with a minimum of adjustment, to work upon a variety of articles with each of which the range of operative movement of the tools is displaced at varying distances from the end plates 49 of the indexing drum.

As indicated previously the indexing mechanism includes a drum having end plates 48 and 49 mounted in supporting members or plates 48a and 49a. Preferably, as shown in Figure 12, these plates are circular and are provided with a plurality (in the present instance six) of circularly arranged, circumferentially equally spaced spindle receiving apertures while the supporting plates 48a and 49a are provided with aligned circular apertures into which the end plates 48 and 49 are rotatably disposed. The indexing drum is completed by the provision of a cylindrical casing 63 which bridges the plates 48 and 49 around the outer extremity thereof and is secured thereto in any suitable manner as by welding or the like. The plates 48 and 49 are, of course, so disposed with respect to one another that the apertures therein are in alignment and this alignment is retained by the casing 63.

Through each set of aligned apertures in the end plates 48 and 49 of the indexing drum a work spindle 64 is disposed. The inner ends of these spindles are enlarged as at 65 while the outer ends thereof have fixedly secured thereto, as best shown in Figure 4, the spindle gears 42 that mesh with the drive gear 41 of the drive shaft 39. Each of the plates 48 and 49 is provided on the outer surface thereof and at each aperture therein with a bearing cap 66 within which is mounted a suitable bearing 67 that surrounds the respective spindle to facilitate rotation thereof with the stock.

From Figure 2 it will be seen that each of the bearing caps 66 extends radially outwardly over the junction between the respective end plates 48 or 49 and the respective supporting plates 48a or 49a. In this manner it will be seen, the drum is securely mounted against axial movement within the plates 48a and 49a. The mechanism for advancing or indexing the drum will be described presently.

STOCK FEED AND CHUCKING MECHANISMS

As best shown in Figures 4 and 5, wherein there is shown the details of the assembly of a spindle 64 with the stock feeding and chucking mechanisms, the spindle extends outwardly or to the right as shown in Figures 1, 2 and 3 from the supporting plate 48, through the respective bearing 67. The end of the outer surface of the spindle 64 is provided with slots cut partially through the thickness thereof and extending longitudinally thereof as shown at 68, each of these slots being arranged to receive a chucking member 69, the details of which will be described presently. A suitable chucking ring 70 having a circular slot 71 formed on the outer surface thereof is mounted over and around the collet assembly for reciprocation relative thereto. This reciprocation is accomplished in the desired sequence by means of a chucking slide 72 provided with a block 73 having a protuberance 74 which fits within the circular slot 71 of the chucking ring 70. In this manner it will be seen that the ring may be rotated without disturbing the engagement thereof with the block 73 and particularly the protuberance 74 thereof.

A chucking tube 75 is disposed to reciprocate within the spindle 64 and is provided at its inner end with a collet jaw arrangement 76 which releasably grips a piece of stock fed therethrough to hold the same against reciprocation within the tube 75. There is also provided at the remote end of the tube 75 a threaded portion on the outer surface thereof which receives a suitable assembly 77 adapted to be abutted and shifted by the chucking member 69 within the respective slot 68 when said members are elongated.

Within the stock gripping tube 75 there is provided, with a sliding fit, a stock feed tube 78 having a split inner end whereby a stock piece within the tube is gripped to be moved forwardly thereby when the tube so moves. This arrangement is best shown at 79 in Figure 5. It will be noted from Figure 5 that if desired the ends 76 and 79 of the tube members 75 and 78 respectively may be separate elements and threadingly engaged with the respective tubes.

The outer end of the stock advancing tube 78 is provided with a radially outwardly extending flange 80 which is the means whereby the tubes 78 are maintained in alignment in their retracted position and also the means whereby these tubes are advanced periodically with the stock to replace a completed article which has been cut off with a new piece of stock.

To the end that the fed stock which is being worked upon and the reserve stock which remains in the tube 78 together with the tube 78, tube 75 and spindle 74 may be rotated during a stock working operation the spindle gears 42 are fixedly secured to the spindle assembly above described by means of a pin 81 which extends with a tight fit into an aperture in the adjacent face thereof, the pin in turn extending through an annulus 82 which is fixedly secured to the spindle 64 and having the head portion thereof fixedly secured in a reciprocable annulus 83 by means of which the pin may be withdrawn from the respective gear 42, whereby the rotative drive for the spindle assembly and that particular piece of stock is disconnected.

As will best be seen from Figure 1 a suitable, rotatable reserve stock supporting assembly is associated with the mechanism shown in Figures 4 and 5 and described above. This assembly may take one of many forms but in the present instance includes a front plate 84 provided with apertures which serve as the outer ends of stock tubes 85, the other ends of the stock tubes being fixedly secured to a plate 86 which is likewise apertured and through which bars of reserve stock may be inserted until they are picked up by the feed mechanism of Figures 4 and 5. As shown in Figure 1, the plate 84 is mounted in the standard 30a while the plate 86 is mounted on an independent standard 86a it being understood that any suitable means may be provided whereby the tubes 85 will be advanced or indexed simultaneously with the indexing movement of the spindle assembly described above.

As best shown in Figure 4, the alignment of the stock feed tubes 78 when they are in their retracted positions is maintained by an aligning ring 87 provided with a track 88 at the inner side thereof. This track, as shown at 89 in Figures 4 and 10, is discontinuous in that it is broken away for a distance sufficiently large enough to permit feed of the respective flange 80 of the tube forwardly to advance and feed stock when each tube attains alignment therewith. In view of the foregoing it will be seen that again a longitudinal, interlocking is attained between the ring 87 and the radial flange 80 of the stock advancing tubes, however, the arrangement is such that indexing may take place without this interlocking engagement being disrupted except as the respective tubes attain a position of alignment with the broken away portion of the ring 87 as shown at 89 in Figure 4.

As indicated previously, longitudinal reciprocation of the chucking ring 70 affords an efficient gripping of the stock within the respective tubes 78, the arrangement being such that movement of the ring toward the left releases the stock and movement of the ring toward the right and into a position shown in Figure 4 causes the assembly 69 to apply radial inward, stock gripping pressure.

Attention is directed to Figure 8 of the drawings wherein assembly 69 is shown in the opened position. This improved construction is a toggle arrangement made up of a lower part 91 and a pressure lever part 90 respectively. The lever part 90 comprises an elongated portion shown extending upwardly in Figure 8 and a head portion which is drilled as at 92 to receive a spring 93 having one end anchored to a pin 94. This head portion is provided on the upper side with a face which is disposed in angular relationship to the adjoining surface of the elongated portion while the opposite face of the head is likewise tapered so that the lever part 91 of the collet may rock about the corner 95 thereof in the recess in which it is disposed when the elongated portion is moved radially inwardly toward the spindle assembly or moved radially outwardly therefrom. The compression part is provided with a cross pin 96 at one end thereof which is suitably, rotatably secured in the head of the lever part and is so disposed that when the adjacent end of the spring 93 is anchored to this cross pin the tension exerted by the spring will cause the parts to remain together. The compression part 91 is preferably slightly tapered divergently toward the remote end thereof which may be drilled out to receive a stud 77a of the assembly 77 which secures the assembly 69 in its respective slot, this pin serving to maintain the adjacent end of the assembly 69 in the slot during operation thereof.

As best shown in Figure 4 the ring 83 is so disposed that reciprocation of the collet operating or chucking ring 70 toward the left is so limited that it cannot attain a position further removed from the stud 77a than that shown in Figure 8. Thus, in this position it will be seen that the ring 70 and the stud 77a serve to retain the assembly 69 in the slot. As will be seen presently, the ring 70 is moved to the position shown in Figure 8 during the rotation of the assembly 69 with the spindle assembly and accordingly centrifugal force will cause the lever part 90 to fly outwardly, thereby raising the compression part 91 and shortening the assembly 69 to move the assembly 77 with the collet operating tube 75 to the left to open collet 76. Movement of the ring 70 to the right causes like movement of the assembly 77 and tube 75 whereby collets 76 are closed to grip the feed stock piece. After the stock has been advanced and tube 75 retracted to the position shown in Figure 4, means is provided for moving the chucking ring 70 to the position shown in Figure 4, whereupon the lever part 90 is cammed radially inwardly to lengthen the assembly 69 to again shift the assembly 77 and tube 75 to close the collet 76.

In closing the collet it will be seen that the ring 70 exerts very little camming action on the radially outer surface of the lever part 90. Rather, it merely slides over this surface as if the latter were on the same plane as the radially inner surface of the ring and progressively forces the elongated portion of the lever part 90 inwardly as this sliding action takes place. With the foregoing it will be seen that there is provided an improved collet assembly in which jamming or excessive wear is entirely avoided.

TOOL ARRANGEMENT

The general arrangement of the various parts of the machine tool and the relationship of stock feed and indexing to the various parts having been described, the disposition of the various tools in the embodiment of the invention shown in the drawings will now be set forth.

As indicated previously, plates 56 and 57 mounted upon the clamps 58 defines a tool carrier mechanism which, in itself, is reciprocable on the supporting bars or members 54.

While certain operations will be described herein, it is to be understood that the sequence of these operations may be changed by movement of the tools in the machine or, if desired, other operations not here disclosed are contemplated within the scope of my invention.

Each of those tools which are mounted within the tool carrier as shown in Figures 1, 2 and 3 such as, for instance, the centering tool 97 and the drill 99 is securely and non-rotatably mounted on the carrier in a suitable manner by attachment to the plate 56 thereof. Since the stock rotates, however, these tools are disposed in their respective mounting for reciprocable movement toward and away from the indexing mechanism 40. Since the general mounting arrangement for all tools utilized herein and others contemplated by my invention may be accomplished in a similar manner only three typical disclosures are made, Figure 15 showing the manner in which an ordinary drill may be mounted, Figure 16 showing the manner in which the centering tool and its associated parts may be mounted and Figure 17 showing the manner in which a threader may be mounted.

As shown in Figure 15 the drill 100 is secured in a mounting member 101 by means of a taper fit or in any other suitable manner. The mounting member 101 is reciprocably mounted in the supporting plate 56 and is provided with a key 102 in the lower side thereof by means of which it is maintained reciprocably in the plate 56 and against rotation therein. Threaded into the rear end of the mounting member 101 is a plunger rod 103 which is in turn connected with the piston in a hydraulic cylinder 104. The sequence of actuation of the piston in the cylinder 104 will be described presently, however, from Figure 15 it will be understood that reciprocation of the piston within the cylinder will cause the drill 100 to advance and retract toward and away from a stock piece protruding from one of the spindles in the indexing drum which is aligned therewith.

As indicated previously, there is provided, in accordance with my invention, a novel electrical circuit which controls the sequence of operation of the piston in the cylinder 104 and to the end that the drill 100 may be reciprocated in accordance with attained positions thereof, switches connected in the circuit which controls the piston are provided. As will be seen from Figure 15, switch 105 is mounted upon the plate 56 and is provided with an actuating arm 106 which is mechanically moved to a retracted position by an abutment rod 107 which is mounted on and moved with the drill. This abutment member 107 is mounted upon a collar 108 which is secured to the shank of the drill itself so that in the event the drill becomes loose in the mounting member 101 the switch 105 will not be operated due to the movement of the tool out of the mounting. Thus there is provided an expedient whereby, when a tool becomes loose and inoperative the energizing switch in the circuit is not actuated with the result that the machine, as will be seen presently, ceases to function.

There is also provided on the mounting member 101 and at the rear end thereof, an abutment collar 101a which actuates the arm 106 of the switch 105 in a direction opposite to that movement caused by the abutment member 107. As will be seen presently, the switch 105 is so arranged in the circuit that continued operation of the machine is prevented unless the abutment member 107 actuates the switch 105 while retraction of the tool and de-energizing of the circuit which controls the piston in the cylinder 104 is caused by engagement of the collar 101a and particularly the abutment member 101b thereon with the switch arm 106.

STOCK FEED CONTROL AND CENTERING MECHANISM

In Figure 16 the details of the centering tool 97a and the associated stock feed trip 109 are shown. As in the case of the drill assembly shown in Figure 15, the centering tool 97a is secured in the end of a mounting member 110 having a key 111 thereon, this mounting member extending through an aperture in the plate 56 for reciprocation therein and being held against rotation by means of the key 111. Similarly, the plunger rod 112 of a piston 113 in an air cylinder 114 is secured by a threaded engagement into the rear end of the mounting member 110. If desired, a spacer 115 may be secured around the mounting member 110, this spacer being attached to the plate 56 to also augment the security of the attachment between the plate 56 and the mounting member 110.

A pair of collars 116 and 117, secured by suitable set screws so that they may be adjusted, are secured around the mounting member 110. The collar 117 has mounted therein an abutment rod 118 which extends rearwardly from the mounting member through an aperture in the plate 56 so that the retracting movement of the mounting member with the centering bit 97a will cause the rear end of the abutment rod 118 to engage with and move the arm 119 of a switch 120. As in the case of the switch 105, the switch 120 is in the individual electrical circuit which indirectly controls the movement of piston 113 within the cylinder 114 and thus it will be seen that the circuit can be energized and de-energized automatically in accordance with predetermined attained positions of the mounting member 110. The collar trips the switch 120 in the opposite direction by engagement with the arm 119 of the switch when the centering tool reaches its most advanced position or in other words has completed its operation. The sequence of these movements and the effect thereof upon subsequent operation of the tool will be more fully described in conjunction with the electrical diagrams shown herein.

The stock feed trip finger 109 is associated with the centering tool 97. This assembly includes, as shown in Figures 5 and 16, a stock abutment plate 121 which extends over the centering tool bit 97a and is provided with an aperture 122 through which the bit 97a may be advanced under circumstances to be explained presently. The stock feed trip finger assembly further includes a reciprocable bar 123 which is mounted to extend through the plate 56 and has the rear end thereof extending into a sleeve 124 which is suitably secured as by welding or the like to the plate 57. Within this sleeve and behind the end of the bar 123 is a compression spring 125 which normally urges the bar 123 with the stock feed abutment plate 121 into a forward position, this position being determined by the abutment of a stop member 126 mounted thereon against the rear side of the plate 56.

Normally the stock feed trip finger assembly is in the position shown in Figure 16. This assembly and particularly the aperture 122 thereof is aligned with the stock feed station of the indexing drum so that as a new piece of stock is fed by the mechanism of Figures 4 and 5, this advancement will take place until the end of a stock strikes the abutment plate 121, whereupon the entire assembly with the rod 123 is moved rearwardly against the compression spring 25 until the rear side of the stop 126 strikes the actuating arm 127 of a switch 128. This switch is incorporated in an electrical circuit which, when energized, initiates operation of the chucking ring 70 and the stock feed slide 72 and since the switch 128 is actuated by the presence of an advancing piece of stock it will be seen that in the absence of stock, in other words when the reserve has run out, the chucking and stock feeding circuits will not be energized. The details of this arrangement will be described more fully in conjunction with the circuits shown herein.

Referring to Figures 4, 5, 10 and 11 it will be noted that as in the case of the drill of Figure 15 and the centering tool of Figure 16, the chucking ring 70 and the chucking slide 72 is operated by a piston in a cylinder 72a, the chucking slide 72 being attached to the plunger rod 72b which is operated by the piston in the cylinder. Also, as in the case of the previously described tools, the chucking slide has fixedly mounted thereon a plunger 72c provided with an abutment member 72d at the end thereof, this abutment member being arranged to engage with and actuate a switch 72e upon completion of the chuck opening operation, that is movement of the chucking ring 70 to the extreme left as shown in the drawings. A companion abutment member 72f repositions the switch 72e when the ring 70 attains its retracted position. This switch 72e is so arranged in the electrical circuit, as will be seen presently, that when actuated by the above described movement it initiates advancing operation. In the absence of this movement of the chucking ring 70, to the left that is the disposal of the chucking ring in stock gripping position therefore prevents the initiation of the stock advancing operation.

As shown in Figures 10 and 11, this stock advancing operation is accomplished by reciprocable movement of the stock tube 78. The flange 80 of the stock tube 78, when that particular tube reaches the stock feeding station of the index drum, leaves the ring 87 shown in Figure 4 and engages in a stock advancing slide 80a which is mounted on a block 80b that is in turn connected with a plunger rod 80c actuated by a piston in a pressure cylinder 80d, the latter being suitably mounted upon a transverse upstanding plate 80e of the machine.

Referring briefly to Figure 25 it will be seen that the stock advancing slide 80a is also provided with means to actuate and open a switch 80f upon stock advancing movement thereof and to close the switch 80f upon retraction thereof after the stock advancing operation has been completed.

THREADING TOOL ASSEMBLY

Referring now to Figures 17 and 18 which disclose a typical threader assembly 98 constructed in accordance with my invention, it will be seen that the assembly includes the usual threader jaws 129. This threader tool 98 differs from those previously described in that the tool itself rotates, there being a speed differential between the rotation of the tool and the stock whereby the threading is accomplished.

To this end, as will be seen from Figures 1, 2 and 17, there is provided an elongated drive shaft 130 having at one end a drive gear 131 and at the other end the threader 98. The gear 131 meshes with the drive train 37 which is in turn driven by the electric motor 33 and thus through the drive shaft 130 the threader is rotated as desired.

The tool mounting mechanism in this instance, as shown in Figure 17 comprises a sleeve 132 into the rear end of which is threaded a plunger rod 133 connected with a piston 134 in the cylinder 135. The sleeve 132, as in the previously described mounting mechanism is keyed as at 136 so that it may be reciprocably mounted in an aperture in the plate 56, yet maintained against rotation relative thereto.

Fitted into the forward end of the sleeve 132 is a journal bearing member 137 through which the adjacent portion of the drive shaft 130 extends, the drive shaft having a collar 130a thereon which abuts the shouldering edge of the journal to prevent reciprocation thereof forwardly within said journal. Thus it will be seen that by means of the drive shaft 130 and the gear 131 the threading tool 98 may be rotated while under the influence of the piston 134 in the cylinder 135, the sleeve may be reciprocated through the plate 56 to advance and retract the threading tool toward and from the work. This reciprocation of the threading tool is accommodated in the drive shaft by the provision, at the outer end thereof, of a telescoping portion 130b which is keyed to the rear part 130. Thus it will be seen that when the mounting sleeve 132 with the threading jaws 129 are reciprocated by the plunger 133 the rotative drive for the jaws is maintained and yet is contracted and elongated in accordance with the reciprocating movement.

From Figure 17 it will be seen that the drive member 130 extends through the pressure fluid mechanism to rotate relative thereto.

As in the case of the drill mechanism and centering mechanism described above, the mounting member 132 is provided with spaced switch abutment members 138 and 139, these abutment members being arranged to actuate the arm 140 of a switch 141 upon attainment of the extreme retracted and advanced positions respectively of the mounting member 132. This switch 141, is connected in the electrical circuit which indirectly controls movement of the piston 134 and thus, as in the previously described assemblies, the controlling circuit for the threader is energized or deenergized in accordance with the predetermined, attained positions of the threader.

To the end that the jaws 129 of the threader 98 may be opened and closed in sequence, there is provided a trip mechanism which includes a rod 142 which is reciprocably mounted in the supporting plates 45, 56 and 57. This rod is provided at the end thereof with a fork member 143, the ends of which ride in a circular track 144 on a collar 145 of the threader mechanism. When this collar 145 is moved forwardly on the threader it actuates suitable means for closing the threader jaws and when it is moved rearwardly thereof, the jaws are caused to open.

To the end that this opening and closing of the jaws may be accomplished automatically in order that the threader can approach the work with closed jaws and remain closed until the threading operation is completed, whereupon they will be automatically opened to permit disengagement of the tool from the work, the rod 142 is provided with a pair of stop members 146 and 147. As the piston 134 is urged through advancing movement, the threader is likewise moved in this direction together with the trip member 143 and the rod 142. During this movement the threader jaws which are closed engage the work and cut the desired thread and this action continues until, by means of the advance during the threading operation, the stop 146 is brought into abutment with the plate 56, whereupon further movement of the member 143 will be stopped so that the collar 145 will be moved relatively rearwardly on the threader to open the jaws thereof to permit disengagement thereof from the stock. Then, due to the actuation of switch 141, in a manner to be presently described, the entire mechanism is retracted by a reverse pressure impressed upon the piston 134, this reverse movement of the entire assembly continuing until the stock 147 on the rod 142 abuts the plate 57, whereupon further movement of the member 143 is prevented and the collar 145 is advanced relative to the threader. This closes the jaws in preparedness for the next threading operation.

FORMING AND CUTOFF OPERATIONS

As will be understood by those skilled in the machine tool art, certain operations, such as those performed by the above described tools, are accomplished by relative movement between the tool and the stock piece along a path parallel to the longitudinal axis or the axis of rotation of the stock piece. Other operations such as forming, swaging, rolling or a cutoff operation are performed, on the other hand, by movement of the tool through a plane normal to the axis of rotation of the stock piece. In other words, the path of the tool is disposed radially of the stock piece.

As best shown in Figure 6, I have provided an improved mounting mechanism for tools of the latter character. The mounting mechanism includes, in the case of the forming tool which performs the second operation upon the stock, an arm 148 which is clampingly engaged as at 149 to the rear supporting member 54 for pivotal movement about the clamped portion. A suitable recess is provided near the remote end of the arm 148 as at 150 for receiving a cutting tool 151 which engages the rotating stock to form the same in the event that, as in the present instance, it is hex bar. The arm 148 is further provided at the tool end thereof with a protuberance 152 which constitutes an abutment member against which a plunger 153, connected to a suitable piston in a cylinder 154 may press when the piston is pressure operated upwardly and to the right as shown in Figure 6.

Secured to the pivoted end of the arm 148 is an extension 155 to which may be pivoted outwardly extending abutment members 156. These abutment members may be adjusted to vary the space therebetween by means of respective bolts 157 and as the plunger 153 rocks the arm 148 and the extension 155 about the respective supporting member 154, they actuate an arm 158 of a switch 159. This switch likewise is in the electrical circuit which controls the operation of the piston in the cylinder 154 and, as in the case of the previously described tool, the operation of the forming tool 151 is controlled in accordance with the attainment of predetermined positions thereof.

If this pivotal action for movement of these tools results in reduced wear between the parts such as occurs with V tracks or the like since for a given stroke of the tool a greatly reduced movement occurs at the pivot portion of the article. As is also shown in Figure 6 the cutoff tool 160 which performs the last operation upon an otherwise completed piece of stock is likewise mounted upon an arm member 161 which is pivoted at the remote end as at 162, to the adjacent supporting member 54. This arm 161 is also provided with an extension 163 against which the plunger 164 operated by a piston in a cylinder 165 may press to urge the tool 160 to the left during a cutoff operation. The cylinder 165 is mounted on a suitable block member 166 upon which is also mounted a bracket 167 through which a threaded arm 168 extends slidably. This arm is provided at the left-hand end thereof as shown in Figure 6 with suitable means 169 for engaging the outer end of the abutment portion 163 of the arm 161 so that the arm 168 moves longitudinally in accordance with swinging movement of the arm 161 during tool advance and tool retraction under the influence of the piston and the cylinder 165. It will be seen that the arm 168 is provided with abutment members 170 and 171. These abutment members alternately engage with an actuating arm 172 of a switch 173, this switch being connected in the circuit which controls the operation of the piston in the cylinder 165. Thus, as in the previously described tools, movement of the cutoff tool 160 and its associated parts causes the switch 173 to be operated whereby actuation of the tool is brought about by virtue of the attainment by this particular tool of predetermined positions.

Mounted upon the arm 168 in any suitable manner is a cam member 174 which, as the cutoff tool 160 is advanced to an intermediate position, engages the actuating arm 175 of switch 176. This switch, as will be seen presently, is so arranged in the electrical circuit that the cutoff tool dwells temporarily until the threading operation which is being carried on simultaneously at the same station of the indexing drum is completed. This arrangement, therefore, prevents the cutoff operation from being completed before the threading operation, under which circumstances the stock piece would no longer be attached to the reserve stock and thus relative rotation between the threader and the stock would not continue. As will be seen presently this dwell arrangement is such that immediately upon completion of the threading operation the final cutoff action takes place whereby the finished piece of stock is discharged to a chute 177 having the deflector 177a that leads to a suitable article receiving bin.

It will be understood that while each and every tool at every station of the indexing drum as shown in Figure 6 has not been described above, an explanation of each type of tool typical of the others has been given. As indicated previously, a variety of tools may be distributed throughout the various positions on the reciprocable tool carrier and upon the swinging arms and furthermore the sequence of the operation may be varied as the particular job requires so long as, for instance, the centering operation is performed before the drilling operation, the stock feed finger 121 is disposed at the first station where incoming stock is advanced and the cutoff operation is performed at the last station, assuming the drum to be indexed and advanced in the direction shown by the arrows in Figure 6.

From the foregoing it will also be seen that whatever type of tool or tool mounting is involved, my invention contemplates generally the tool itself, an advancing and retracting tool carrying element, a fluid pressure mechanism for advancing and retracting the tool, an electrical circuit for controlling a valve in the fluid circuit for changing the direction of movement of the fluid pressure means and switches for controlling the circuit, said switches being actuated only after the tool mounting member and the tool have attained certain predetermined positions, for instance, either a fully retracted position whereby the circuit for the next performance may be set up or a fully advanced position (representing completion of the operation) whereby the tool is taken out of action.

*The indexing mechanism*

As best shown in Figures 12, 13 and 14 there is provided around the indexing drum casing 63, preferably at a central point thereof, a plurality of arcuate, circumferentially spaced rails 178, the spaces between these rails comprising driving notches, the purpose of which will be explained presently.

As shown best in Figures 2 and 3 these rails are preferably disposed in spaced sets which are aligned with one another so that the driving notches therebetween are also in alignment. On each side of the rails there is mounted a flexible band 179, this band having fixedly secured to one end thereof, as by welding or the like, a shoe 180 which is pivotally mounted as at 181 to the outer end of a plunger 182 that is reciprocated by a piston which is pressure controlled within the cylinder 183. The other end of the band 179 is bent radially outwardly as at 184 and is spaced from the end to which the shoe is attached. The shoe 180 is provided with a radially outwardly extending portion 180a that opposes the portion 184 on the band. These radially outwardly extending portions are provided with apertures through which bolts 185 may extend, there being a tension spring 186 on the bolts between the outwardly extending portions 180a and 184. Thus it will be seen that the band 179 is normally sprung inwardly toward the surface of the drum. A driving member 187 is mounted transversely of the band 179 and is of such a width that it fits into the respective driving notches between the blocks 178. It will be seen that if the band is spaced from the surface of the drum at that part which carries the driving member 187, the latter will be urged radially outwardly, out of engagement with the respective notch so that the band may be rotated relative to the drum. If, on the other hand, the band is contracted tightly around the drum casing 63 and the driving member 187 is aligned with one of the driving spaces or grooves, then it will fit into the groove and upon rotation, the band will cause rotation of the indexing drum.

The band is normally retained in a contracted condition with the driving member 187 disconnected from one of the respective notches by means of the tension spring 186. This tension is caused by the inward movement of the members 180a and 184 at the respective ends thereof under the action of the spring 186.

Therefore, when the plunger 182 is retracted the spring 186 expands to disengage the driving member 187 from the respective groove. When, however, pressure is applied to the bottom of cylinder 183 and the piston therein, with the plunger 182, is moved in an upward direction, the spring 186 is compressed thereby drawing the driving member 187 into the aligned groove in the first instance and thereafter rotating the entire drum because of the engagement of the groove with the driving member until the drum positions shown have been moved forward to advance them one position.

It will be noted that there is provided in the bed 30 an upstanding bracket 188 on which is fulcrumed a lever 189. The cylinder 183 is pivoted as at 190 at one end of the lever 189 while a link 191 is pivoted to the other end thereof as at 192. This link extends generally upwardly and preferably is bent around one of the supporting members 54 so as not to engage the same and terminates at its upper end in a pivot linkage 193 with a lock arm 194 which is in turn pivotally connected with one of the longitudinally extending supporting members 54 as at 195. There is provided at an intermediate part of the lock arm 194 an abutment portion 196 to which is secured a lock member 197 that under certain circumstances, engages in an adjacent locking groove to securely retain the indexing drum against further rotation during operation of the tool. This abutment portion also engages with an actuating arm 198 of a switch 199 located in a relay set-up circuit to be explained presently.

When the plunger arm 182 moves upwardly in order to advance the indexing drum, downward pressure is exerted upon the adjacent end of the lever 189 whereby the opposite end rises to lift the link 191 and the lock arm 194 upwardly and pivotally about the respective supporting member 54. During this action the indexing drum is advanced one position and also due to the action of lever 189 the lock member 197 is released from the respective locking groove to permit rotation of the drum. Furthermore, this rising action of the arm 194 causes the portion 196 thereof to engage the switch arm 198, thereby to raise the same. After the drum has advanced one position and the plunger 182 is retracted through switch means to be described presently, the lever 189 rocks back to the position shown in Figure 12, thereby closing switch 199 therein to complete the master relay setup circuit in which the switch 199 is incorporated (see Figure 24). The switch 199 is a single throw bridging contact switch and the arm 198 thereof is spring biased in a downward direction against the abutment portion 196 of the arm 194.

As will also be seen from Figure 12, a lever assembly 200 is pivotally mounted as at 201 to the base 30. Preferably this lever 200 is broken at an intermediate point and has inserted therein a shock resistant medium such as a rubber cushion 202, the assembly being maintained rigid by a sleeve 203. A switch 204 having two sets of bridging contacts 205 and 206 therein is mounted at the upper end of the lever assembly 200, this switch including a movable bridging member 207 which is actuated by a pivoted actuating arm 208. The arm 208 is in turn rocked by a link 208a the latter in turn being rocked by a trigger member 209 which is pivoted to an upstanding part 210 of the lever. A suitable spring 211 is secured between the trigger member 209 and the upstanding member 210 whereby the trigger is spring biased into an upward position. For this reason it will be seen that the bridging member 207 in the switch 204 is normally spring biased to bridge contacts 206. There is also provided at the upper end of the lever assembly 200, in a movable relationship thereto, a cam face 212. It will be understood that the length of the stroke passed through by the plunger 182 and thus by the band 179 and the driving member 187 is so adjusted so as to move the driving member 187 an arcuate distance equal to the distance between any two adjacent driving notches between the rails 178 as shown in the drawings. Furthermore, it will be understood that the relative position of the parts described above in conjunction with the lever assembly 202 are devised to enable the following operation to occur.

When the plunger 182 is forced outwardly from the cylinder 183 the band 179, which is normally sprung outwardly to disengage the driving member 187 from a groove is contracted during the initial movement of the plunger to fall within the groove nearest the switch assembly as shown in Figure 12. Thereafter continued movement of the plunger and rotation of the band causes the indexing drum to advance a single position since the stroke of the piston is long enough to bring the band from the position shown in Figure 12 to the position X therein. This movement of the drum is accomplished also by a removal of the locking member 197 from the groove in which it is engaged due to the rocking action of the lever 189. As the driving member 187 reaches the end of its travel toward the position X the locking groove in the position of that shown at Y in Figure 12 is drawn downwardly to engage the sharp point of the trigger 209 thereby to lower the same and to operate the switch to move the bridge member 207 from the contacts 206 to the contacts 205. This energizes another circuit in which the contacts 205 are incorporated as will be more fully explained presently.

It will thus be seen that positive engagement between the point of the trigger 209 and the wall of the advancing groove *y* causes the bridge member 207 to be moved over to the contacts 205 to bridge the same against the action of spring 211. The circuit which controls the fluid pressure in cylinder 183 is broken by contacts 206, to be explained more fully presently, and is so arranged that as soon as the indexing operation is completed a reverse pressure is applied whereby the plunger 182 together with the band 179 starts a reverse movement from that described above. This reverse movement is of course possible since upon retraction of the plunger 182 the driving member 187 is immediately disengaged from the groove X and rides over the top of the adjacent portion of blocks 178. This movement of the driving member 187 continues until it attains the circumferential position shown in Figure 12. However, during this motion it has engaged with the cam face 212 at the upper end of the lever assembly 200 to rock the same about the pivot 201 whereupon the trigger 209 is released from the groove which is holding it downwardly whereupon the spring 211 immediately snaps the linkage system in the reverse direction to move the bridging member 207 to the contacts 206, the circuits of contacts 205 having in the meantime been energized to perform its function namely to reset the individual tool operating circuits in a manner to be described presently.

It will be understood from the foregoing that when the plunger 182 has reached its outermost position from the cylinder 183 the next succeeding driving groove has been moved into alignment with the member 197 on the lock arm 194 whereupon reverse action of the plunger immediately causes the member 197 to drop into this next succeeding groove to again lock the indexing drum against movement during the succeeding tool operation.

As will be best seen from Figure 6, the end plates 48 and 49 of the indexing drum together with the plate 84 of the reserve stock carrier may be mounted in circumferentially spaced shoes 213 which are equidistantly spaced preferably at four points around the drum and mounted on the plates 49a and 49b. Thus the drum is provided with a suitable way in which to rotate within these plates. It will be understood, of course, that the shoes for the stock carrier plate 84 will be mounted in any suitable manner in the standards 30a which support the same.

As shown in Figures 26 and 27, the shoe members 213 are essentially angle members, one arm 214 thereof being provided with slots 215 adapted to receive bolts 216 by means of which the shoes are maintained on the machine. The shoes also include arms 217 which extend into cut-away parts of the respective plates 48a and 49a. The arms 217 are provided with spacer bolts 218 by means of which, when the bolts 216 are loosened, the shoes may be adjusted with respect to one another to define a circular way having a given position with the respective plate 48a or 49a. As will be seen, the radially inner surfaces of the ways are curved to slidingly receive the adjacent edge of the respective end plate 48 or 49 of the indexing drum. In this manner it will be seen that the operator can loosen the bolts 216 and then, by adjustment of spacer bolts 218, may predetermine the setting of the indexing drum with respect to the plates 48a and 49a.

*The electrical system for controlling the operation and sequence of operation of the various instrumentalities*

Broadly speaking, the electrical system as shown in Figure 23, and as shown fragmentarily in Figure 24, includes (1) an indexing circuit represented in dotted lines, (2) a plurality of tool operating circuits connected with the bus and each having an individual ground, (3) an individual trip circuit for each tool and associated with the respective tool operating circuit in a manner to be set forth presently.

The indexing circuit includes, in series, a plurality of make and break bridge contacts, certain of which are completed only upon completion of the respective tool operation and others of which are completed only upon attainment of a retracted, starting position by the respective tool. Thus, the indexing circuit is incomplete and the indexing operation can not be performed until two things have happened with respect to each of the tools, namely, each tool must have completed its operation in the previous cycle and each must be retracted out of the path of the indexed stock.

Each of the tool operating circuits includes (a) a solenoid for operating a valve in an individual pressure circuit for the respective tool whereby predetermined movement of the tool may be attained in accordance with the position of the valve and thus in accordance with the energization or deenergization of the respective tool operating circuit; (b) a manual throw out switch whereby any given circuit or circuits may be completely removed from the operative cycle of the machine if the respective tool operation is not needed; (c) a contact which is closed upon retraction of a tool to starting position whereby the respective circuit is energized for the next succeeding operation and which is opened upon completion of the respective tool operation and attainment of a forward or advanced position to temporarily take the respective tool operating circuit out of the electrical system. This permits deenergization of the respective solenoid whereby the respective valve may spring into a position to permit reverse movement of the respective tool.

The trip circuits each includes a trip solenoid whereby the above-mentioned contacts in the operating circuit are opened upon completion of a tool operation and whereby the above-mentioned respective contacts in the indexing circuit are closed to partially complete the same upon completion of the respective tool operation. There is also provided in each trip circuit a make and break contact by means of which the circuit is energized only upon completion of a tool operation and attainment of a forward or advanced position by the respective tool.

In describing the circuits, both electrical and hydraulic, shown in Figures 23 and 24, representative tool operating circuits and trip circuits will be discussed in detail, it being understood that other like circuits shown in full in the drawings are similar and operate in the same manner.

In comparing Figures 23 and 24, it will be seen that Figure 24 is fragmentary, as compared to Figure 23, so far as the electrical circuits are concerned, and furthermore that for purposes of clarity certain of the elements have been slightly rearranged in the latter figure.

In Figure 24 representative tool constructions are shown schematically and the association of the tool parts with the fluid pressure and electrical means are shown. It will be understood that the various mechanical elements heretofore described cooperate in a similar manner with the fluid pressure and electrical means.

*The indexing circuit*

As shown in Figure 23, there is provided a source of electrical energy 219, including a bus 220 and a ground 221. The indexing circuit includes a lead 222 connected with the bus 220 which in turn is connected with a solenoid 223 that operates a four-way valve V4 connecting with opposite ends of the indexing cylinder 183 to operate the same through an indexing operation previously described. There is shown in Figure 19 a typical solenoid-valve arrangement whereby the pressure circuits in the machine may be operated. Such a construction includes the solenoid 225 and a valve 226. From Figure 19 it will be seen that reciprocation of the armature of the solenoid will control the valve, the latter being designed in the manner indicated by the diagrammatic views of the valves V as shown in Figure 23.

The solenoid 223 of the indexing circuit has a light circuit 224 bridged therearound, this light circuit containing a bulb 224a which lights when the indexing circuit is energized and is, of course, extinguished when that circuit is deenergized. A lead 227 connects the solenoid 223 with the switch 204 shown in Figure 12 and described above, there being a lead 228 for connecting the switch 217, through switches 229 and 72e to a bank of make and break contacts 230 which are connected in series and, when open, render the indexing circuit inoperative. As will be seen presently, each of the contacts 230 is associated with one of the tools.

The series of make and break contacts 230 are connected by a lead 231 to a bank of make and break contacts 232 which are connected in series and, like the contacts 230, render the indexing circuit inoperative when opened, there being a ground connection provided for the indexing circuit as at 233. The switches 232 are the double bridging contact switches that are associated with the various operating instrumentalities to be operated by movement thereof, some of which have been previously described. For instance, switch 120 is that which is associated with the centering tool to be operated by abutment members 116 and 118. As will be seen from Figure 23, the left hand poles of this switch, when bridged, complete a respective portion of the indexing circuit shown in dotted lines. The right hand poles, on the other hand, energize a trip solenoid 234 by connecting the same with the bus through lead 235 through lead 236 to said solenoid, and thence to ground connection 237.

From the foregoing, it will be seen that when the bridging member 120a of the switch 120 is moved to the left through a retracting operation, contacts 232 will be closed and that portion of the indexing circuit will be complete. On the other hand, when the centering tool is advanced through its operative motion, bridging member 120a bridges the right hand contacts of the switch 120, thus to energize solenoid 234. When this occurs, the armature 238 is moved upwardly to break the toggle arrangement 239 and open contacts 240. These contacts 240 complete a tool operating circuit which includes a lead 241 from the bus that connects through the solenoid 242 that operates valve $V_1$, this valve being that which controls the direction of flow of fluid to cylinder 114 that operates the centering tool in one direction or the other. Thus it will be seen that the switches 232 are actuated by the respective tool mountings as described above in conjunction with the centering tool to complete the indexing circuit upon retractive movement of the mounting to indicate that the operation has been completed, while the indexing circuit is broken through reverse movement of the mounting and the contacts operating solenoid 234 are energized to open contacts 240 which are connected by a lead 243 to the solenoid 242 and thence to the bus 220. It will therefore be seen that unless each tool is in a retracted position and the left hand contacts of switches 232 are closed, the indexing circuit is incomplete and indexing cannot take place.

As a further precaution against indexing, particularly when the tools are in advanced position, the push rod 238 in moving upwardly carries a swing armature 244 which is pivoted at 242 and has its remote end engaging a movable contact member 243 which, when the rod 238 moves upwardly, closes against a companion contact 243a to complete that section of the indexing circuit.

Thus, again, it will be seen that the indexing circuit is essentially controlled by the contacts 230 which are open when the tool is in an advanced position and when the tool operating circuit is completed and operative through contacts 240, and the indexing circuit is closed only upon breaking of the tool operating circuit at contacts 240 and return of the tool mounting to a starting position.

As shown in Figure 23, a representative or typical set of operations as used herein are indicated at each of the switches 232. It will be understood that the sequence of the operations there indicated may be changed and that other machine operations may be substituted therefor. The operation of other elements like those described above, in conjunction with the centering circuit, are the same as set forth above, and accordingly these circuits will not be individually described except for those in which additional control operations are incorporated.

*Centering, stock feeding and chucking control*

As shown in Figure 25, the centering, stock feeding and chucking assemblies and circuits are interrelated in such a manner that operation of one effectively controls the other. Assuming the various parts to be in the position shown in the figure, it will be seen that the stock feed trip member 121 is urged forwardly by the spring 125 whereby the collar 126 permits the spring urged switch to assume the position shown at 128. It is now desirable to advance stock preparatory to a centering operation.

However, the chucking ring 70 is in its extreme right hand position and thus the collet is closed and the stock is gripped. Since a cut off operation has been completed, it is necessary to advance the stock to the centering tool so that it protrudes from the indexing drum. Assuming the machine to be in operation, the position of switch 128 is such that the solenoid 245 is energized by virtue of its connection to the bus through lead 246, thence through the solenoid, through lead 247, through the switch 128, through lead 248 to ground 249, through closed contact 240 of the tool operating circuit. The valve $V_2$ is operated by energization of the solenoid 245 to cause flow of pressure medium to the front side of the piston in the cylinder 72a. This shifts the chucking ring to the left to open the collet and to release the stock, and at the same time, causes bridging of the left hand poles of the switch 72e. When these poles are bridged, the energizing circuit for the stock feed solenoid 251 is completed by a lead 252 with the bus, through the solenoid 251, through lead 253, to switch 72e to lead 254, and through lead 255 to ground 249. It will be noted that as this chuck releasing operation takes place the indexing circuit is broken in the switch 72e to prevent accidental indexing during the next cycle of operation.

When solenoid 251 is thus energized, it operates valve $V_3$ to cause fluid pressure to be applied to the rear side of cylinder 80d, thus forcing the tube 78 forwardly through a stock feeding motion. The switch 80b is immediately opened upon the initiation of this stock feeding action to break the indexing circuit at that respective part. This stock feeding motion continues until the stock abuts the trip member 121, whereupon the latter is moved to the left of Figure 25 until collar 126 breaks the stock feeding circuit through solenoid 251 in switch 128 and closes the left hand contacts therein which are in the centering tool circuit. This centering tool circuit includes a lead 256 connected to the bus 220, to centering tool control solenoid 242, through lead 258, through switch 128 to lead 243, thence through contact 240 to ground 249. It will be understood that each of these independent circuits includes a light circuit such as that described above, the centering tool light being shown at 260.

Upon energization of the solenoid 242 by means of the above circuit, valve $V_1$ (see Figure 23) is operated to direct the flow of fluid to the rear of the piston in cylinder 114. The centering tool is thus advanced toward the work and the bit passes through aperture 122 in the trip member 121 to engage the stock. During this movement, the left hand contacts of the indexing circuit are opened in switch 120 and the right hand contacts are closed thus energizing, as described in conjunction with Figure 23, the trip solenoid 234 which in turn operates the armature 238 to break the toggle 239 which opens contacts 250 and draws the arm 244 upwardly to close contacts 243 and 243a.

From the foregoing, it will be seen that the switch 120 of the indexing circuit has been opened upon initiation of the centering operation while this circuit, which was previously opened by plunger 238, is closed at contacts 243 and 243a only upon completion of the operation and opening of the contacts 240 which breaks the operating circuit for the centering tool. In other words, the indexing circuit is completed at contacts 243—243a only upon completion of an operation, in this instance the centering operation, and is completed in the switch 120 only upon full retraction of the tool, indicating readiness for a subsequent operation. Furthermore, from the foregoing it will be seen that operation of the stock advance mechanism is impossible unless the collet is opened by left hand movement of the chucking ring, since the left hand contacts in the switch 72e are not closed to energize the particular control circuit until a chuck opening operation has occurred.

Another attribute of the system shown in Figure 25 is that, in the absence of advancing stock, the trip member 121 will not be retracted. Hence the centering operation will not be initiated and contacts 243—243a will not be closed. Under such circumstances, the indexing circuit remains incomplete and operation of the machine manifested initially by an indexing operation cannot occur.

Another advantage of this arrangement is that, in the event that the cycle of operations does include drilling, and hence a centering cut is not required, stock advance and chuck operating mechanisms may be obtained merely by removing the centering bit 97a whereby the mounting then comprises only a switch actuating instrumentality without performing a centering operation upon the stock.

Each of the tool operating circuits may be provided with a manual throw switch M by means of which any particular circuit may be permanently thrown out of the system. These switches, of course, are normally in a closed position if operation of the circuit is desired. Furthermore, a jumper 261 (see Figure 23) is preferably utilized when a given manual switch M is opened to bridge the respective index contactor 230.

*Trip mechanism*

Figures 20, 21 and 22 disclose the master relay circuit, one element of which has been described in conjunction with the centering tool circuit. As described in conjunction with Figure 25, the master relay circuit includes a plurality of mechanisms, each including a tool operating circuit make and break contact 240 and an indexing circuit make and break contact 230. The structural details of Figures 20, 21 and 22 will be described in corelation with the description of these parts as given above and as shown in Figure 25.

As shown best in Figure 1, the casing of the indexing mechanism 40 serves as a support for the master relay switches 262, this casing also serving to support a light panel 263 upon which are mounted all of the lights of the various circuits. Thus the operator, by viewing the light panel, can tell precisely the status of operation of the machine and which circuits are causing trouble if the machine ceases to function properly, this being indicated by certain of the lights being extinguished out of the predetermined sequence.

As will be seen from Figures 21 and 22, the various parts of the master relay circuit are arranged as described in conjunction with Figure 25. The movable contacts of the make and break assembly 249 are spring urged into an open position by spring 264 whereby once the rod 238 has broken the toggle assembly 239 from the position shown in Figure 22, the spring takes over and snaps the assembly open.

The respective section of the indexing circuit is embodied in the lower part of the mechanisms shown in Figures 20, 21 and 22. It will be seen that current entering the first of the contacts 230 at the left of Figure 20 when these contacts are closed, passes through a conductor, 265, thence through the next contact, thence through an upper conductor 266, thence through the next succeeding and so on throughout the entire bank of contacts, the indexing circuit being connected by the lead 228 at the right of Figure 20 (see also Figure 23).

*Resetting mechanism for master relay circuit*

As indicated previously in the description of the indexing mechanism, contacts 205 of switch 204 are bridged and contacts 206 are opened by completion of drum rotation when trigger 209 is operated by engagement thereof in an oncoming groove. Furthermore switch 199 is closed when locking member 197 falls into the respective groove upon retraction of plunger 182 into cylinder 183. Upon complete retraction drive member 187 resets switch 204 by engagement with cam 212. As will be seen from Figures 23 and 24, these switches are embodied in a circuit which includes a lead 267 connected with the bus 220. This lead includes the respective manual switch M which is normally closed and connects with a master resetting relay 268 which in turn operates an armature 269 for purposes to be described presently.

The relay 268 has connected therewith a lead 270 which includes switch 199, contacts 205 of switch 204, and the contacts of a repeater push switch 271, all connected with a lead 272 which is connected with the indexing circuit at 273, whereby connection is made with the indexing circuit ground 233. Thus when the manual switch M is closed and an indexing operation has been completed it will be seen that the solenoid 268 is energized from the bus through the ground 233 of the indexing circuit, causing operation of the armature 269. It will be understood, of course, that at this stage of the cycle of operation the previous tool operations have caused the tool circuit contacts such as that shown at 240 to open and the indexing circuit contacts 230 to close. It is now necessary to recondition the tool operating circuits by closing contacts 240 and to break the indexing circuit by opening the contacts 230. This is accomplished by movement of the armature 269.

Referring to Figures 21 and 22, it will be seen that after a given cycle of operations wherein each of the tools has performed its functions, the master relay switch will be in the position shown in Figure 21, that is, the operating circuit contacts 240 will be open and the indexing circuit contacts 230 will be closed. It is now necessary to close the contacts 240 for the next succeeding operation and to open the indexing contacts 230 to prevent a succeeding indexing operation unless, during the next cycle, each and every tool operation is completed. As indicated previously, when the indexing movement is completed, the contact member 197 will drop into the respective driving groove to permit the closing of switch 199. Previously, the driving member 187 was returned in an upward direction as shown in Figure 12, whereby the same engages the cam face 212 to permit the trigger 209 to release the spring 211 whereby contacts 206 in the switch 204 are closed. The resetting circuit for the reset solenoid 268 is then completed through the ground 233 whereby the armature 269 closes all of the contacts 240 to complete and condition each tool operating circuit and at the same time to open each of the indexing circuit contacts 230 that will not again be closed until completion of each succeeding operation by the respective tool.

When the solenoid 268 is energized, the armature 269 is drawn upwardly to pivot members 274 about the common retaining shaft 275 whereby ears 276 thereon urge the junction of the toggle links downwardly into the position shown in Figure 22. This lengthens the toggle and causes contacts 240 to close about the pivot points 277. This downward movement of the toggle links engages the respective member 238 whereby the armatures 239 of the respective trip solenoid 234 and the respective armatures 244 are forced downwardly out of engagement with the associated contact assemblies 230 to permit the same to open. The respective tool operating circuits are now closed for a subsequent operation, during which the respective valve V will be operated and the indexing circuit broken at contacts 230, this condition prevailing until the respective tool has completed its operation and moved to a forward position, whereupon the right hand contacts of the switch 232, as shown in Figure 23, will be closed to energize the respective trip solenoid 234. This causes movement of the respective rod 238 to open the respective contacts 240 and to move the respective armature 244 upwardly, to close the respective indexing circuit contacts 230.

*A representative fluid pressure circuit for tool operation*

As best shown in the left hand side of Figure 24, the electrical circuits described above are so associated with the pressure circuits that tool operation as described above may take place. The system may, of course, be either pneumatic or hydraulic, and in the present instance a suitable hydraulic circuit will be shown and described.

This circuit includes a reservoir $R_1$ and an auxiliary reservoir $R_2$. Fluid for forward drive of the tools is drawn from the reservoir $R_1$ while fluid for the return of the tools is drawn from reservoir $R_2$. A high pressure pump 278 forces fluid from the reservoir $R_1$ to a manifold 279 through a pressure conduit 280. Fluid then passes through a manually operative valve 281 by means of which the feed speed of the respective tool may be controlled, through a conduit 282 and a valve 283 to the rear side of a piston in a tool operating cylinder, the drill cylinder 104 being shown in Figure 24 by way of example. It will be understood, of course, that the valve 283 represents one of the valves indicated at V in Figure 23.

The member 283a in the valve 283 is in a lower position as shown in Figure 24 by virtue of the fact that the tool operating circuit has previously been completed by closure of the respective contact assembly 240, the movement of the member 283a being accomplished by operation of the solenoid 283b in the respective tool operating circuit. Again it is to be understood that the solenoid 283b is identical to the solenoid 242 shown in Figure 23, and is one of those incorporated in one of the drill operating circuits there indicated.

The tool then advances into the work and, as shown in Figure 23, this advance continues until the contacts at the right hand side of switch 105 are closed by abutment with the member 101a, whereupon the respective trip solenoid 234 is energized to open the respective contact 240 and deenergizes the tool operating circuit, whereupon the member 283a in the valve 283 will be moved to the position shown in Figure 24 whereby the pressure conduit 284 is opened to the rear of the cylinder and serves as an exhaust return.

Upon return movement of the piston under the influence of low pressure fluid flowing from the reservoir $R_2$ through the conduit 285, check valve 286 and conduit 287 to the front end of the cylinder, the switch 105 is operated to complete its respective part of the indexing circuit and thus to play its part in conditioning the electrical system for the next succeeding indexing operation which results in resetting of the broken contacts 240.

The reservoir $R_2$ is provided with a pressure relief conduit 288 having a pressure relief valve 289 therein whereby the desired pressure is maintained in that reservoir. Fluid is fed to the auxiliary reservoir $R_2$ from the manifold 279 by means of a pressure conduit 290 having a suitable pressure reducing valve 291 therein. It will be understood, of course, that fragmentary conduits 282a, 284a and 285a merely represent those conduits which, like the conduits 282, 284 and 285, lead to the desired parts of the system. Since in each tool the principles involved are the same and the structures are likwise similar, only the drill is shown completely.

From the foregoing it will be seen that advancing pressure is applied to the tools and various other operating instrumentalities through the medium of high pressure fluid delivered from the reservoir $R_1$. Since some of the tools will complete their respective operation before others and will thus trip switches 232 before others, utilization of fluid pressure from reservoir $R_1$ would detract from the force necessary to advance the tools still operating. In the present construction and in view of the operation of valve 283, and furthermore in view of the low pressure return reservoir, this would not occur since return pressure is obtained from reservoir $R_2$.

A regulating valve 281a, like the valve 281 may be utilized to regulate the feed speed of the tool.

*Cut off dwell*

As will be seen from the foregoing, the stock which is being worked upon that protrudes from the indexing mechanism is rotated and held against translatory movement by virtue of its mechanical connection with the reserve stock in the indexing drum which in turn is secured in the collets 76. Thus it will be seen that once a cut off operation has been completely performed, no further work may be performed upon the particular stock piece which is cut off. If that stock piece is still incomplete, and still is embedded in the jaws of the threader 98 for instance, then operation of the machine is delayed in order that manual removal of the stock piece may be accomplished. If, however, the threading operation is permitted to be completed before cut off is completed, the threader disengages itself automatically from the stock piece.

The manner in which the solenoid 296 is deenergized temporarily to permit the valve V5 to spring into position to withdraw the cutting tool will now be described. Assuming that the machine is passing through its intended cycles, the cut off tool operating circuit is completed to energize the solenoid 293 of the cut off valve V6, and the threading tool operating circuit is completed to energize the solenoid 301 of the threading tool valve V7, whereby these respective valves are moved to a position to direct pressure fluid to the rear of the operating cylinders thereof. Thus tool advance for these operations is obtained.

As indicated previously, however, a cam 174 which operates the switch 176 advances with the cut off tool. As shown in Figure 23, the switch 176 is a double bridging contact switch having two sets of contacts 176a and 176b. The switch is spring urged into condition whereby contacts 176a are bridged, these contacts being incorporated in a lead 292 which connects to one side of the solenoid 296, the latter being connected on its other side by a lead 303 back into this operating circuit. Under these circumstances, the solenoid 296 is energized to hold the valve V5 open. The valve V5 being in the associated circuit for the front of the cylinder 165 and being opened permits advance of the cut off tool.

Intermediate the cut off operation, however, the cam 174 advances to operate switch 176 in such a manner that contacts 176a are opened to deenergize the solenoid 296. This permits valve V5 to spring to a closed position thereby to shut off the exhaust from the front end of the cylinder 165 (see also Figure 24) thus to prevent further cut off operation. It will be understood, of course, that the threading operation continues toward completion during operation of switch 176. The cam 174, when the operation of switch 176 is effected, moves the bridging member thereof into a position to connect contacts 176b, thereby substituting lead 302 of solenoid 296 for lead 304 which connects the same with the lead 305 of the threading operating circuit. Since the operating circuit contacts 306 and 307 of the cut off and threading operating circuits are closed, it will be seen that the solenoid 296 remains deenergized since it is connected between two grounds, namely ground 308 of the cut off operating circuit and ground 309 of the threader operating circuit. This condition prevails so long as the threader continues to operate. However, upon completion of the threading operation, the respective switch 232 thereof is operated to energize the trip solenoid 310 thereof which results in contacts 307 of the threader circuit being opened. This disconnects the ground 309 from the lead 304 of solenoid 296, but it will be seen that the lead 304 is now connected as at 304a (see Figure 23) to the bus 220 through the lead 311 of the threader circuit and the solenoid 301 thereof, with the result that the lead 311 and the solenoid 301 now serve as a low resistance conductor between the bus 220 and solenoid 296 which is of higher resistance, whereby the latter is again energized since it is grounded at 308 by virtue of the closed condition of contact 306 in the cut off circuit. Under these circumstances, the solenoid 296 now again opens the valve V5 to permit continuation of the exhaust of pressure fluid from the front of cylinder 165 (see Figure 24). It will be seen that the pressure behind the piston in cylinder 165 is now effective to move the cut off tool through the rest of its cut off stroke, this stroke being, of course, terminated by operation of the respective switch 173 in the cut off circuit. This, of course, energizes trip solenoid 312 of the cut off assembly to open contacts 306 to stop the cut off operation, to return the cut off tool to starting position, and to permit the bridging member of switch 176 to return to contacts 176a.

From the foregoing it will be seen that the cut off operation is necessarily dwelled at an intermediate period therein and that this operation can not be completed until completion of the threading operation has conditioned the circuit of solenoid 296 whereby it permits reopening of exhaust valve V5.

As best shown in Figures 6, 23 and 24, the cut off operation is accomplished by inward movement of the cut off arm 161 under the influence of the piston in cylinder 165. This operation is started simultaneously with the threading operation and to the end that the cut off operation may be started and then dwelled until completion of the threading, there is provided a shut off valve V5 in the conduit 292 leading to the front end of cylinder 165, this conduit serving as the pressure medium exhaust during advance of the cut off tool. Thus it will be seen that if valve V5 is closed during the advance of the cut off tool that advance must stop for lack of cylinder exhaust so long as valve V5 is closed.

From Figure 24 it will be seen that the cylinder 165 is not subjected to high pressure fluid as is the case of drills and the like. Instead there is provided a branch pressure conduit 292 from the low pressure conduit 288. This branch conduit 292 leads into the valve V6 which is controlled by solenoid 293, the conduit 294 carrying pressure to the rear of cylinder 165 to operate the cut off tool.

The drills and the like require a wide range of working pressures to accommodate different work, while the cut off and forming tools require constant working pressure. Hence the latter tools may be operated from the low pressure reservoir as described above.

The exhaust for cylinder 165 includes a conduit 295 in which is incorporated the shut off valve V5 operated by solenoid 296 and a manual control valve 297 similar to valves 281 and 289 previously described. There is also incorporated in this exhaust pressure circuit a check valve 298 which affords quick return of the fluid to the front of the cylinder 165 during retraction and checks flow outwardly from the front thereof during the cut off operation to insure quick return movement. Thus the exhaust from the front of cylinder 165 during advance of the tool may be controlled solely by valve V5. The exhaust fluid from conduit 295 passes through valve V6, thence through conduit 299 having a control valve 300 therein, back to the reservoir R2. It will be understood, of course, that reverse flow from that described above will take place upon operation of valve V6 to return the tool.

Interrupter arrangement

In the operation of a drill or the like, particularly when a deep cut is necessary or the drill hole is of such magnitude that prolonged operation is necessary, it is desirable to interrupt the cutting and to withdraw the tool from the work to permit complete flushing for a coolant and to permit cooling of the work and the tool. Means for accomplishing this will now be described.

As shown in Figure 23, the lead 313 connects an interrupter circuit including the lead 314, to the bus 220. This lead 314 has contacts 315, 316, 317 and 318 incorporated therein, each contact being associated with a bridging member 319, 320, 321 and 322 respectively, the bridging member concerned being connected with the drill operating circuits previously described.

Thus when any one of these bridging members is connected to the respective contact in the lead 314, the bus 220 is directly connected with the respective operating circuit. The lead 314, however, is connected with the lead 323 by means of a single bridging contact switch 324, one contact thereof being incorporated in the lead 314 at 325 and the other being connected in turn with the lead 323 through lead 326.

It will be seen that the lead 323 has contacts 327, 328, 329 and 330 incorporated therein, these latter contacts being engageable by the respective bridging members 319, 320, 321 and 322, whereupon the bus is connected to the respective operating circuits through the switch 324 when the respective bridging member of that circuit is connected to the respective contact in the lead 323.

The bridging member 324a is normally held upwardly to bridge the contacts in the switch 324 by a trip relay 331 which is connected by leads 332 and 333 with the lead 323. Thus it will be seen that as long as the bridging member 324a is in an upper position as shown in Figure 23, current will flow from the bus to the lead 323 and thence through respective contacts therein to the respective operating circuits.

It is assumed, of course, that the bridging members 319 to 322 will be in a lower position in Figure 23 only if a deep drill operation that requires intermittent cooling is being performed by the respective drill.

To the end that the drill may be periodically withdrawn from the stock to permit cooling of the bit and work and to permit entrance of the coolant, means is provided for periodically tripping the relay 331 momentarily whereby switch 324 is opened to disconnect those drill operating circuits being energized through the leads 326 and 323. This means includes a thermostatic trip 334 which, when heated, trips the armature 335 of the relay 331 to permit downward movement thereof since closure switch of 234 deenergizes solenoid 331. This downward movement of the armature causes a latch 336 on the armature to engage the bridge member 324a in its downward movement to break the contacts in the switch 324. This energizes trip solenoid 331 to cause immediate return of the armature 335 and closure of switch 324, the armature again being engaged and held in its upper position by the thermostat element 334 which is now cooled. This results in reenergization of the tool circuits, whereby the tools are again advanced toward the stock to continue operation thereon.

The means for heating the thermostatic contact 334 includes a heating element 337 connected in the circuit by a lead 338 through a variable resistor 339 to ground 340. It will be seen that adjustment of the resistor will control the time required for the heating element 337 to attain a sufficiently high temperature to operate the thermostat 334 and trip the solenoid 331. If high periodicity is required for tool withdrawal, in the case of particularly hard metals, the resistor is opened to a greater degree than when a low periodicity of tool withdrawal is required.

It will be understood that when the solenoid 331 is tripped to break the tool operating circuits, the heating element is also deenergized, whereby it cools to permit cooling of the thermostat 334, whereupon the interrupting sequence is again repeated. This intermittent making and breaking of the circuit at the switch 324 insures intermittent withdrawal and advance of the drill until the operation thereof is completed, whereupon the respective switch 232 is operated to energize the respective trip circuit previously described.

Attachment mechanism

As shown in Figures 29, 30, 31 and 32, my invention may be embodied in an assembly attachable to and detachable from a machine tool. This assembly includes a housing 341 which comprises a pressure cylinder. A piston 342 having an operating plunger 343 is mounted within the cylinder to reciprocate therein, the plunger 343 preferably being non-circular in cross section to prevent rotation of the piston and fitting through an aperture in a closure head 344. The cylinder housing 341 is provided with a fluid port 345 at the rear end thereof and another fluid port 346 at the front end thereof, fluid being intermittently forced through these ports in opposite directions to obtain advance movement and retracting movement of the piston and the plunger 343.

A conductor 346 mounted within an insulator 347, which is in turn mounted in an attachment shank 348, is extended through a suitable aperture in the closure head 344, the rear end of the conductor having a contact 349 thereon and the forward end receiving a lead 350, over which may be disposed a protective insulating shoe 351. A companion contact member 352 is suitably mounted on the piston 342 and is aligned with the contact 349 so that it engages the same upon forward movement of the piston. The cylinder housing and the piston are grounded in any suitable manner as at 353, whereby it will be seen that the circuit involved will be completed upon engagement of contacts 349 and 352 when the piston 342 is in its advanced position. connected between leads 350 and 353 is a trip circuit of the character shown in connection with the tools in Figure 23, a tool operating circuit including a valve operating solenoid and a valve which controls the flow of fluid to the cylinder housing 341 in the same manner described in conjunction with the previously described tools.

To the end that the tool, such as the drill shown at 354, may be securely mounted in the plunger 343 and may be withdrawn therefrom, there is provided a tapered sleeve 355 which is split as at 355a. This tapered sleeve includes an interior surface which is adapted to receive the shank of the drill in close contact therewith and also includes a tapered, threaded exterior surface by means of which the tapered sleeve may be threadingly engaged in the threaded interior of the plunger 343 and compressed therein. With this construction, it will be seen that removal of the tool may be accomplished with facility merely by rotating the tapered sleeve 355, whereby the sleeve spreads to release the tool shank.

It will be understood that upon the engagement of contacts 349 and 352 the electrical and pressure fluid circuits, such as those heretofore described, will be energized or deenergized, as the case may be, to cause the return of the piston 342 in its cylinder.

To the end that less energy will be required to return the piston when fluid pressure is admitted through the port 346, the pressure area on the fore side of the piston has been reduced. This reduction is accomplished herein by increasing the size of the cross-sectional dimensions 343.

To the end that the working stroke of the tool of the device shown in Figure 29 may be varied and may be limited with considerable precision, the attachment shank 348 is threadingly engaged through the aperture of the closure head 344. Thus by rotation of the shank, the contact 349 is shifted longitudinally of the cylinder or parallel to the path of movement of the tool. Since engagement of contacts 349 and 352 determine the precise limit of feed stroke of the tool, it will be seen that adjustment of the shank 348 affords a predetermination of the forward limit of the working stroke passed through by the piston 342, plunger 343 and tool 354. It is to be understood that the use of the term "tool" herein is intended to include not only those instrumentalities which perform work upon the stock but also those such as the chucking ring 70 which contribute to the successful operation of the machine.

Operation

The specific details of construction of the solenoid-valve structures such as 242—V₁, 245—V₂, 251—V₃, 223—V₄, 296—V₅ and 293—V₆, shown in Figure 19 will not be set forth since the construction, operation and incorporation thereof in pressure circuits such as shown in Figure 24 will be fully understood by those skilled in the art. It should be noted, however, that in operation these valves are spring pressed to a position to exhaust the rear of the respective cylinder and divert pressure to the front thereof and electrically moved to direct pressure at the rear of the respective cylinder to provide tool advance. Thus it will be seen that the breaking of contacts 240 which deenergizes the respective tool circuits results in deenergization of the respective valve solenoid to permit the valve to spring to a position in which it exhausts the rear of the cylinder and applies return pressure at the front thereof.

This return of the respective tools and instrumentalities causes the respective switches 232 to be operated to complete the indexing circuit, whereupon indexing takes place in the manner previously described.

Completion of the indexing operation closes switches 199 and 205 so that the resetting circuit energizes the master reset solenoid 268 which completes all previously open tool circuits by closing respective contacts 240.

Each operating circuit is now completed from the bus 220 to the respective ground such as 237 in the centering circuit through the closed contacts such as 240, and thus the valve solenoids are energized to operate the respective valves to their tool advance position in the respective pressure circuits.

The centering tool circuit of Figure 23 is of course completed at switch 128 only if reserve stock is present in the machine to operate the trip member 109 of Figure 25. As indicated previously, if the machine has run out of stock in the indexing station now aligned with the centering tool 97, this trip member is not operated and the respective indexing contact 230, comprising contact members 243 and 243a, will not be closed so that the machine no longer functions due to the failure of the next indexing operation due to open contact 230.

If, however, reserve stock is present in the indexing station now aligned with the centering tool, the mechanism of Figure 25 functions as previously described to set up new stock to be operated upon successively by the tools as the stock is indexed through the machine. The stock advancing operation having been completed and the chucking mechanism having been closed, the tools now advance toward their respective aligned stock pieces to operate thereon. This advance of each of the tools continues, and as each reaches the completion of its operation, it operates its respective switch 232 (see Figure 23) to close the right hand contacts thereof, thereby to energize the respective trip solenoid such as shown at 234.

The armature 238 of the respective solenoid is then operated to open the respective contacts 240 and to close the respective indexing circuit contacts 230. This sequence of operations continues with each individual tool until all have completed their operation, thus opening all of the operating circuit contacts 240 and closing all of the indexing circuit contacts 230, the latter indicating that all of the tools have completed their operation.

The respective tool operating circuits having been deenergized by opening of contacts 240 therein, the respective valve solenoids such as shown at 242 and 293 are likewise deenergized to permit spring operation of the respective valves to a position whereby the pressure circuits direct return pressure to the respective tool cylinders.

This return movement of the cylinders results in a bridging of the left hand contacts of switches 232 with the result that the indexing circuit is progressively completed. When each of the tools has so returned and the indexing circuit is completed, the indexing valve solenoid 223 is energized to move the valve V₄ into a position whereby pressure is applied behind the piston in cylinder 183, it being understood that the contacts 240 still open so that the respective tool operating circuits are still inoperative.

The indexing operation having been completed, contact 206 of switch 204 is opened and contact 205 of the same is closed. This starts the return of drive member 182 in the cylinder 183 and thereupon closing of switch 199 to energize the resetting circuit in the manner described above. The master resetting solenoid 268 then closes all the contacts in the operating circuit to initiate a subsequent cycle of operation similar to that described above. In the meantime, the drive member 182 in cylinder 183 continues to retract to its normal position, and upon completion thereof drive member 187 resets contacts in switch 204, i. e. closing contact 206 and opening contact 205. This next cycle is then completed, but a further indexing after the next cycle is not accomplished unless reserve stock has been advanced to the centering tool to initiate a centering operation during this cycle.

As will be seen from the foregoing, the particular arrangement of the electrical circuits and of the pressure circuits in the machine may be varied in accordance with expediencies of design, that is the various conduits may be disposed at different parts of the machine if desired. Accordingly no attempt is here made, other than in the schematic-diagrammatic views in Figures 23, 24 and 25 to indicate or describe any particular position for these conduits, some of which are shown in the upper portion of Figure 7.

If desired, the master control for starting or stopping the machine may be accomplished by operation of the throw switch M₁ connected between the solenoid 223 and switch 204 as seen in Figure 23. While in the present embodiment the various pressure cylinders are provided with opposite ports whereby fluid pressure is utilized to operate the pistons in both directions, it will be understood that retraction of these pistons may be accomplished by a spring return.

As described above, the master relay panel shown on Figures 20, 21 and 22 represents a set of switches whereby any one of the electrical circuits may be controlled from that point. It is also contemplated that, if desired, all of the manual pressure control valves may be collected in the same manner on a respective panel, whereby the operator with considerable facility may control the machine and particularly the nature of operation of the various instrumentalities independently. Furthermore, in addition to the visual indicia represented at 263, lights such as shown at 224a in Figure 3 may be associated with the electrical circuits whereby inoperativeness of any of the pressure conduits throughout the machine will be instantly discernible to the operator.

What is claimed is:

1. In an automatic machine tool, a bed, a supporting plate upstanding from said bed and disposed transversely relative thereto, an indexing drum rotatably supported on said bed and spaced longitudinally from said supporting plate, said drum being adapted to receive rotatably a plurality of stock pieces therethrough, supporting members extending between said plate and said indexing drum, a tool carriage mounted on said supporting members, a plurality of tools disposed in said tool carriage for reciprocation longitudinally of the axis of stock in said indexing drum, tool carrier arms movable for moving tools on said carriage transversely of said stock, means to reciprocate the tools in said carriage, means to move said tool carrier arms transversely of said stock, means to index said drum to advance the stock therein from one tool to another, and means to rotate the stock in the drum, said last named means including a drive member said drive member extending longitudinally through the machine, through said supporting plate, the tool carriage and the indexing drum and terminating in a drive connection for rotating the stock, means to mount said tool carriage reciprocably upon said support members extending between the supporting plate and the drum and means to vary the longitudinal position of the tool carriage on said supporting members.

2. The combination in a machine tool having a cut off tool and another operating member, pressure means for operating said tool and said member, an electrical circuit for controlling each of said pressure means having contacts therein which are broken when operation of the tool or member respectively is completed, an exhaust pressure conduit for the pressure means of said tool, an exhaust control valve for opening and closing said exhaust conduit, an auxiliary electrical circuit for controlling the exhaust control valve, said auxiliary circuit including a solenoid having leads to the tool operating circuit, a double bridging contact switch in series with said solenoid, the first side of said switch connecting the auxiliary circuit with the tool operating circuit and the second side thereof connecting the auxiliary circuit between the tool and member operating circuits and between the grounds thereof, means for actuating the switch to close the first side thereof whereby the tool and member operating circuits and the auxiliary circuit may be energized together to operate the tool and the member and to open said exhaust valve, means operable by partial advancement of the cut off tool to close the other side of said switch and connect the auxiliary circuit between the operating circuits and between the grounds thereof to de-energize the same to afford closure of the exhaust valve to dwell the advancement of the cut off tool while the operation of said member continues to completion, thereby to open the contact in the circuit thereof to disconnect the ground thereof from the auxiliary circuit and thus energize the same whereby the exhaust valve is opened to afford continuation of advancement of the tool operation to completion.

3. In a machine tool, stock holding means, a stock working tool and another operating member, means for operating said tool and said member simultaneously on the same piece of stock, and means for controlling the operating means of the tool to dwell the operation thereof intermediate its stock working stroke until completion of the operation of said operating member and means for then continuing the operation of the tool to completion.

4. In a machine tool, stock holding means, a stock working tool and another operating member, means for operating the tool and said member simultaneously on the same piece of stock including electrical circuits therefor and means carried by the tool for rendering the tool operating circuit ineffective after partial operation thereof, and means for rendering said circuit effective to operate the tool after completion of the operation of the operating member.

5. In combination with a stock working tool and another operating member, electrical circuits for operating said tool and said member simultaneously, an auxiliary circuit for rendering the circuit of the tool selectively operative and inoperative, means in the tool for rendering the auxiliary circuit inoperative upon partial movement of the tool in a stock working direction, and means for reenergizing said auxiliary circuit upon completion of the operation of said member.

6. In a machine tool, a reciprocating tool holder, a tool in said holder, means for actuating said tool holder to reciprocate the same, a control element for governing the operation of said means, a trip member reciprocable with said tool holder for engaging said control element, and means for attaching said trip member to the tool so as to be movable therewith and upon displacement of the tool to be ineffective to engage and trip said control element.

7. In a machine tool, a rotatable work support for rotating a plurality of work pieces positioned around the axis of the support, means to index said support means to rotate each work piece on its axis, means to support a plurality of tools in longitudinal alignment with said work pieces, fluid pressure means to reciprocate said tools in the support to and from the work pieces in the performance of predetermined operations, a first control means fixing the length of time of the reciprocatory stroke of each of said tools, a second control means cooperable with said tools to index said work support upon completion of the operations of all of said tools, means interconnecting said control means and said fluid pressure means to vary the number of strokes in accordance with the condition of the progress of the work while maintaining the time of the stroke constant, and means to actuate said indexing mechanism upon completion of the reciprocation of all tools.

8. In a machine tool, a rotatable work support for carrying a plurality of spaced work pieces positioned around the axis of the support, means for indexing said support means to rotate each work piece on its axis, a support adapted to hold a plurality of tools in longitudinal alignment with said work pieces, means to reciprocate said tools in the support to and from the work pieces in the performance of predetermined machine operations, a first control means for fixing the length of time of each reciprocatory stroke of said tools a second control means operable upon completion of the operations of all of said tools to actuate said indexing mechanism, means electrically interconnecting said control means and said tools to operate the tools through a variable number of strokes, said first and second control means and said tools being electrically interconnected so that the reciprocatory strokes of said tools are variable in number dependent upon the progress of the tooling operation, said means for reciprocating the tools comprising a hydraulic piston for positively moving the tools forward against the work and against a cushion of fluid and means releasing each of said tools after the lapse of a pre-set time in its forward position being for movement on the return stroke by the pressure of the cushioning fluid.

9. In a machine tool, a rotatable work support for carrying a plurality of spaced work pieces positioned around the axis of the support, means to index said support, means to rotate each work piece on its axis, means to support for a plurality of tools in longitudinal alignment with said work pieces, fluid pressure means for reciprocating said tools in the support to and from the work pieces in the performance of predetermined machine operations, a first control means for fixing the length of time of each reciprocatory stroke of said tools a second control means cooperable with said tools to index said work support upon completion of the operations of all said tools, means electrically interconnecting said control means and tools to vary the number of reciprocatory strokes of said tools dependent upon the progress of the tooling operation, an electric circuit in said second control means which is energized to effect indexing of the work support when all of the tools have been returned from their forward work performing positions.

10. In a machine tool, an indexing drum, grooves on said drum and means for rotating the drum through an indexing operation including a resilient split band extending around the drum and having a driving member thereon arranged for engagement in one of said grooves when the band is drawn into surface engagement with the drum, means for spreading the free ends of the band to urge the same radially outwardly from the drum thereby to carry the driving member out of driving engagement therewith, said means including a spring member disposed between the ends of the band, means for rotating the drum including a reciprocable member secured to one end of the band thereby to first draw the ends together to provide engagement between the drum and the driving member and thereafter to draw the driving member through a predetermined path of movement during which it revolves the drum, said reciprocable member being arranged to then retract to spread the band and disengage the driving member from the drum and to then move the band with the driving member in a reverse direction through which it travels in advancing the drum and relative to the drum.

WILLIAM S. PEARSON.

REFERENCES CITED

The following references are of record in the file of this patent:

UNITED STATES PATENTS

| Number | Name | Date |
|---|---|---|
| 332,889 | Gerry | Dec. 22, 1885 |
| 756,377 | Kimber | Apr. 5, 1904 |
| 915,173 | Hanson | Mar. 16, 1909 |
| 963,691 | Davenport | July 5, 1910 |
| 1,779,529 | Brophy | Oct. 28, 1930 |
| 1,909,596 | Summey | May 16, 1933 |
| 1,911,138 | Clute et al. | May 23, 1933 |
| 1,934,620 | Cone | Nov. 7, 1933 |
| 1,947,348 | Lovejoy | Feb. 13, 1934 |
| 1,975,007 | Kingsbury | Sept. 25, 1934 |
| 1,978,059 | Rickert | Oct. 23, 1934 |
| 2,019,155 | Ruppel | Oct. 29, 1935 |
| 2,078,698 | Svenson | Apr. 27, 1937 |
| 2,083,312 | Brown et al. | June 8, 1937 |
| 2,089,078 | Tyson | Aug. 3, 1937 |
| 2,090,262 | Montgomery et al. | Aug. 17, 1937 |
| 2,114,284 | Barnes et al. | Apr. 19, 1934 |
| 2,116,376 | Anderson | May 3, 1938 |
| 2,118,015 | Montgomery | May 17, 1938 |
| 2,118,021 | Curtis | May 17, 1938 |
| 2,118,025 | Curtis | May 17, 1938 |
| 2,148,348 | Groene et al. | Feb. 21, 1939 |
| 2,252,840 | Drissner | Aug. 19, 1941 |
| 2,289,957 | Godfriaux | July 14, 1942 |
| 2,305,407 | Crago | Dec. 15, 1942 |
| 2,308,348 | Ballash | Jan. 12, 1943 |
| 2,330,859 | Bench et al. | Oct. 5, 1943 |
| 2,339,435 | Stephan | Jan. 18, 1944 |
| 2,429,938 | Mansfield | Oct. 28, 1947 |